United States Patent [19]

Hashiguchi et al.

[11] Patent Number: 5,596,041
[45] Date of Patent: Jan. 21, 1997

[54] HYDROGENATED BLOCK COPOLYMER AND HYDROGENATED BLOCK COPOLYMER COMPOSITON

[75] Inventors: Yoshiharu Hashiguchi, Yokkaichi; Minoru Hasegawa, Suzuka; Kunio Goshima, Yokkaichi; Yasuhiko Takemura, Yokkaichi; Yoshiyuki Higuchi, Yokkaichi; Motokazu Takeuchi, Yokkaichi, all of Japan

[73] Assignee: Japan Synthetic Rubber Co., Ltd., Tokyo, Japan

[21] Appl. No.: 414,230

[22] Filed: Mar. 31, 1995

[30] Foreign Application Priority Data

Apr. 4, 1994 [JP] Japan .................. 6-087278
Apr. 4, 1994 [JP] Japan .................. 6-087279

[51] Int. Cl.$^6$ .................. C08F 297/02; C08L 53/00
[52] U.S. Cl. .................. 525/98; 525/89; 525/314; 525/227; 525/232; 525/179; 525/184; 525/167
[58] Field of Search .................. 525/98, 314, 179, 525/184, 89, 167, 232, 227

[56] References Cited

U.S. PATENT DOCUMENTS

| | | | |
|---|---|---|---|
| 4,107,236 | 8/1978 | Naylor et al. | 525/314 |
| 4,980,421 | 12/1990 | Teramoto et al. | 525/338 |
| 5,169,905 | 12/1992 | Hashiguchi et al. | 525/338 |
| 5,191,024 | 3/1993 | Shibata et al. | 525/314 |
| 5,206,301 | 4/1993 | Hattori et al. | 525/314 |
| 5,216,074 | 6/1993 | Imai et al. | 525/66 |
| 5,270,274 | 12/1993 | Hashiguchi et al. | 502/115 |
| 5,296,547 | 3/1994 | Nestegard | 525/314 |
| 5,306,779 | 4/1994 | Shibata et al. | 525/314 |
| 5,346,964 | 9/1994 | Shibata et al. | 525/334 |
| 5,399,627 | 3/1995 | Diehl | 525/314 |

FOREIGN PATENT DOCUMENTS 0409580  1/1991  European Pat. Off. .

*Primary Examiner*—Irina Zemel
*Attorney, Agent, or Firm*—Oblon, Spivak, McClelland, Maier & Neustadt, P.C.

[57] ABSTRACT

A hydrogenated block copolymer or hydrogenated block copolymer mixture consisting essentially of (a) hydrogenation product of a star-branched block copolymer represented by the structural formula $(A–B)_n X$ wherein A is a polybutadiene block having a 1,2-vinyl content of less than 25% by weight and B is a copolymer block containing 50% by weight or more of a conjugated diene compound whose vinyl content is 25% by weight or more, X is a coupling agent residue and n is an integer of 3 or more, and (b) a hydrogenation product of a straight chain block copolymer represented by the structural formula A–B wherein A and B are as defined above, the weight ratio of the component (a) to the component (b) being 100/0 to 5/95, and a hydrogenated block copolymer composition comprising (I) 1 to 99 parts by weight of said hydrogenated block copolymer or hydrogenated block copolymer mixture and (II) 99 to 1 part by weight of a thermoplastic resin and/or a rubbery polymer. Said hydrogenated block copolymer or hydrogenated block copolymer mixture can be pelletized and is excellent in the improving effect on impact resistance, heat resistance, stiffness, processibility and appearance of molded article when used as a quality-improving agent for a thermoplastic resin. Said hydrogenated block copolymer composition is a composition having excellent balance of impact resistance, heat resistance, stiffness, processibility and appearance of molded article or a thermoplastic elastomer having excellent mechanical properties.

16 Claims, No Drawings

HYDROGENATED BLOCK COPOLYMER AND HYDROGENATED BLOCK COPOLYMER COMPOSITON

BACKGROUND OF THE INVENTION

This invention relates to a hydrogenated block copolymer or hydrogenated block copolymer mixture obtained by hydrogenating a star-branched structure-containing block copolymer or block copolymer mixture, respectively, said hydrogenated block copolymer or hydrogenated block copolymer mixture being excellent in various properties such as heat resistance, weather resistance, flow properties and the like and also excellent in the improving effect on impact resistance, heat resistance, stiffness, processibility, appearance of molded article and the like as a modifier for other thermoplastic resins; and can give, when blended with other rubbery polymers, a thermoplastic elastomer composition excellent in mechanical properties. This invention also relates to a hydrogenated block copolymer composition obtained by blending the above-mentioned hydrogenated block copolymer or hydrogenated block copolymer mixture with a thermoplastic resin and/or a rubbery polymer, said composition being a thermoplastic resin composition excellent in balance of impact resistance, heat resistance, processibility, appearance of molded article and the like or a thermoplastic elastomer composition excellent in mechanical properties.

Diene copolymers having double bonds in the polymer chain are inferior in thermal stability, weather resistance and ozone resistance. Therefore, in order to overcome these disadvantages, it has been known to hydrogenate the double bonds. Methods for the hydrogenation are proposed in, for example, Japanese Patent Application Kokoku No. 45-39, 275 and No. 45-3,555; Japanese Patent Application Kokai No. 56-62,805 and No. 59-133,203 and the like. The hydrogenated polymers obtained by these methods exhibit heat resistance, weather resistance and ozone resistance as expected, so that they are often used in the quality-improvement of resins. Also, as a polymer excellent in thermal stability and weather resistance, ethylene-α-olefin copolymers and the like are known. However, these polymers are not satisfactory to obtain a composition having a good balance of impact resistance, heat resistance, stiffness, processibility and appearance of molded article by blending them with a thermoplastic resin.

SUMMARY OF THE INVENTION

This invention has been made in the background of the above-mentioned prior art problem and an object of this invention is to provide a hydrogenated star-branched block copolymer or a hydrogenated star-branched block copolymer mixture which can be easily pelletized, can improve the blocking resistance of pellets, is excellent in various properties such as heat resistance, weather resistance, flow properties and the like, can improve such characteristics as impact resistance, heat resistance, stiffness, processibility, appearance of molded article and the like as a modifier for other thermoplastic resins and can give, when blended with other rubbery polymers, a mechanically excellent thermoplastic elastomer.

Another object of this invention is to provide a hydrogenated block copolymer composition obtained by blending said hydrogenated star-branched block copolymer or hydrogenated star-branched block copolymer mixture with a thermoplastic resin, said composition being excellent in balance of impact resistance, heat resistance, stiffness, processibility, appearance of molded article and the like.

Still another object of this invention is to provide a hydrogenated block copolymer composition which is a thermoplastic elastomer composition having excellent mechanical properties obtained by blending said hydrogenated star-branched block copolymer or hydrogenated star-branched block copolymer mixture with a rubbery polymer.

Other objects and advantages of this invention will become apparent from the following description.

According to this invention, there is provided a hydrogenated block copolymer or hydrogenated block copolymer mixture which consists essentially of:

(a) a hydrogenation product [referred to hereinafter as the hydrogenated block copolymer (a)] of a star-branched block copolymer represented by the structural formula $(A-B)_n X$ (referred to hereinafter as the star-branched block copolymer) wherein A is a polybutadiene block having a 1,2-vinyl content of less than 25% by weight; B is a conjugated diene polymer block comprising at least 50% by weight of a conjugated diene compound whose vinyl content is at least 25% by weight; X is a coupling agent residue; and n is an integer of 3 or more, the content of the block A being 5 to 60% by weight and the content of the block B being 95 to 40% by weight, provided that A+B=100% by weight, and at least 80% of the double bonds of the conjugated diene portion of the star-branched block copolymer having been hydrogenated, and (b) a hydrogenation product [referred to hereinafter as the hydrogenated block copolymer (b)] of a straight chain block copolymer represented by the structural formula A-B (referred to hereinafter as the straight chain block copolymer) wherein A and B are as defined above, the content of the block A being 5 to 60% by weight and the content of the block B being 95 to 40% by weight, provided that A+B=100% by weight, and at least 80% of the double bonds of the conjugated diene portion of the straight chain block copolymer having been hydrogenated, wherein the weight ratio of the hydrogenated block copolymer (a) to the hydrogenated block copolymer (b) is 100/0 to 5/95 and the weight average molecular weight of the total of the hydrogenated block copolymer (a) and the hydrogenated block copolymer (b) is 50,000 to 700,000.

This invention further provides a hydrogenated block copolymer composition comprising, as the essential components, (I) 1 to 99 parts by weight of the above-mentioned hydrogenated block copolymer or hydrogenated block copolymer mixture and (II) 99 to 1 part by weight of a thermoplastic resin and/or a rubbery polymer, provided that (I)+(II)=100 parts by weight.

DETAILED DESCRIPTION OF THE INVENTION

The hydrogenated block copolymer or hydrogenated block copolymer mixture of this invention consists essentially of the hydrogenated block copolymer (a) and the hydrogenated block copolymer (b) and each of the hydrogenated block copolymers (a) and (b) has the blocks A and B in the molecule.

The block A is a polybutadiene block segment whose 1,2-vinyl content before hydrogenation is less than 25% by weight, preferably 20% or less and more preferably 18% by weight.

The block A is converted by hydrogenation into a crystalline block segment similar in structure to conventional low density polyethylene (LDPE).

When the 1,2-vinyl content of the block A is 25% by weight or more, the hydrogenated block copolymer obtained becomes soft, and when it is pelletized, the resulting pellets tend to adhere to one another, so that when they are blended with a thermoplastic resin to prepare a composition, a difficulty arises in handling and operation such as blending and the like. Also, the impact resistance of a composition obtained by blending them with a thermoplastic resin is deteriorated and the mechanical properties of a composition obtained by blending them with a rubbery polymer are deteriorated. Therefore, such vinyl contents are not desirable.

The block B is a conjugated diene polymer block segment which, before hydrogenation, contains 50% by weight or more of a conjugated diene compound whose vinyl content (here, the vinyl content includes 1,2-vinyl content and 3,4-vinyl content) is 25% by weight or more.

The block B is derived from a conjugated diene polymer or a copolymer of a conjugated diene compound and other monomers and is converted by hydrogenation into a block segment similar in structure to a rubbery ethylene-butene copolymer or an other monomer-ethylene-butene copolymer.

Here, the conjugated diene compound used in the block B may be at least one member selected from the group consisting of 1,3-butadiene, isoprene, 2,3-di-methyl-1,3-butadiene, 1,3-pentadiene, 2-methyl-1,3pentadiene, 1,3-hexadiene, 4,5-diethyl-1,3-octadiene and chloroprene. However, 1,3-butadiene, isoprene, 1,3-pentadiene are preferable in view of industrial utilization and for obtaining hydrogenated block copolymers having excellent physical properties, and more preferable are 1,3-butadiene and isoprene.

Said other monomers which may be used in the block B include styrene, t-butylstyrene, α-methylstyrene, p-methylstyrene, divinylbenzene, 1,1-diphenylstyrene, N,N-diethyl-p-aminoethylstyrene, N,N-diethyl-p-aminoethylstyrene, vinylpyridine and the like. Styrene and α-methylstyrene are particularly preferable.

Incidentally, when the block B is derived from a copolymer of the conjugated diene compound with said other monomers, the distribution of the conjugated diene compound may be either at random, tapered (the proportion of the monomer component increases or decreases along the polymer chain), in the partial block form or any combination of them.

The content of the conjugated diene compound in the block B is 50% by weight or more, preferably 60% by weight or more, and when it is less than 50% by weight, the glass transition temperature of the block B increases, and the mechanical properties of the hydrogenated block copolymer obtained and the quality-improving effect thereof become inferior, so that such contents are not desirable. The vinyl content of the conjugated diene compound in the block B is 25% by weight or more, preferably 30 to 95% by weight, and when it is less than 25% by weight, the hydrogenated block copolymer exhibits a crystalline structure due to polyethylene chain and has resinous properties, so that when it is blended with a thermoplastic resin, the impact resistance-improving effect of the composition obtained becomes low.

The hydrogenated block copolymer or hydrogenated block copolymer mixture of this invention comprises at least (a) a hydrogenation product of a star-branched block copolymer represented by the formula $(A-B)_nX$ and preferably consists essentially of (a) said hydrogenation product and (b) a hydrogenation product of a straight chain block copolymer represented by the formula A-B and hence having a lower molecular weight than that of the star-branched block copolymer. Incidentally, the hydrogenated block copolymer of this invention may comprise a hydrogenation product of another block copolymer represented by the formula $(A-B)_2X$ wherein A, B and X are as defined above.

The content of the block A in each of the star-branched block copolymer and the straight chain block copolymer is 5 to 60% by weight, preferably 5 to 55% by weight, and more preferably 10 to 50% by weight. When the content of the block A is less than 5% by weight, the hydrogenated block copolymer obtained becomes soft and when the hydrogenated block copolymer is pelletized, the resulting pellets tend to adhere to one another, and when a composition is prepared by blending the pellets with a thermoplastic resin, a difficulty arises in handling and operation such as blending or the like. Also, the impact resistance of the composition obtained becomes low. When a composition is prepared by blending the pellets with a rubbery polymer, the mechanical properties of the composition obtained become inferior. Therefore, such block A contents are not desirable. On the other hand, when the content of the block A exceeds 60% by weight, the impact resistance of the composition obtained by blending with a thermoplastic resin becomes low, so that such block A contents are not desirable.

The content of the block B in each of the star-branched blocked copolymer and the straight chain block copolymer is 95 to 40% by weight, preferably 95 to 45% by weight, and more preferably 90 to 50% by weight. When the content of the block B exceeds 95% by weight, the hydrogenated block copolymer obtained becomes soft, and when the hydrogenated block copolymer is pelletized, the resulting pellets tend to adhere to one another, and when a composition is prepared by blending the pellets with a thermoplastic resin, a difficulty arises in handling and operation such as blending or the like. Also, the impact resistance of the composition obtained becomes low. When a composition is prepared by blending the pellets with a rubbery polymer, the mechanical properties of the composition obtained become inferior. Therefore, such block B contents are not desirable. On the other hand, when the content of the block B is less than 40% by weight, the impact resistance of the composition obtained by blending with a thermoplastic resin becomes inferior, so that such block B contents are not desirable.

In the hydrogenated block copolymer or hydrogenate block copolymer mixture of this invention and the hydrogenated block copolymer or hydrogenated block copolymer mixture used in the hydrogenated block copolymer composition of this invention, the weight ratio of the hydrogenated block copolymer (a) to the hydrogenated block copolymer (b) is 100/0 to 5/95, preferably 95/5 to 20/80, more preferably 95/5 to 40/60. The ratio is most preferably 95/5 to 80/20 because the composition obtained by blending the hydrogenated block copolymer or hydrogenated block copolymer mixture with a thermoplastic resin is especially excellent in balance of flow properties, impact resistance and stiffness when the ratio is within said range. When the proportion of the hydrogenated block copolymer (a), the proportion of the hydrogenated block copolymer (a) is less than 5% by weight, the improving effect on the impact resistance of the composition obtained by blending the hydrogenated block copolymer or hydrogenated block copolymer mixture with a thermoplastic resin becomes low and the mechanical properties of the composition obtained by blending the hydrogenated block copolymer or hydrogenated block copolymer mixture with a rubbery polymer becomes inferior, so that such proportions of the hydrogenated block copolymer (a) are not desirable.

The hydrogenated block copolymer or hydrogenated block copolymer mixture of this invention has a weight average molecular weight of the total of the hydrogenated block copolymer (a) and the hydrogenated block copolymer (b) of 50,000 to 700,000, preferably 70,000 to 650,000 and more preferably 100,000 to 650,000. When the weight average molecular weight is less than 50,000, the impact resistance-improving effect when the hydrogenated block copolymer or hydrogenated block copolymer mixture is blended with a thermoplastic resin becomes low and the mechanical properties of a composition obtained by blending it with a rubbery polymer are inferior, so that such weight average molecular weights are not desirable. On the other hand, when the weight average molecular weight exceeds 700,000, the flow property of the hydrogenated block copolymer or hydrogenated block copolymer mixture obtained becomes low and when the hydrogenated block copolymer or hydrogenated block copolymer mixture is blended with a thermoplastic resin, the processibility of the composition obtained and the appearance of molded article formed from the composition become low.

The process for producing the hydrogenated block copolymer or hydrogenated block copolymer mixture of this invention may be any process and the hydrogenated block copolymer or hydrogenated block copolymer mixture of this invention may be prepared by separately preparing the hydrogenated block copolymer (a) and the hydrogenated block copolymer (b) and then blending them; however, in general, the hydrogenated block copolymer or hydrogenated block copolymer mixture is produced by preparing the straight chain block copolymer, which is the component (b) before hydrogenation, by living anionic polymerization using an organic alkali metal compound as an initiator in an organic solvent; adding a polyfunctional coupling agent thereto; subjecting the resulting mixture to coupling reaction in which the amount of the polyfunctional coupling agent added is adjusted, thereby controlling the coupling degree so that the weight ratio of the hydrogenated block copolymer (a) to the hydrogenated block copolymer (b) falls in said range, to obtain a block copolymer or block copolymer mixture containing the star-branched block copolymer (the component (a) before hydrogenation); and then subjecting the same to hydrogenation reaction.

As the above organic solvent, there can be used hydrocarbons such as pentane, hexane, heptane, octane, methylcyclopentane, cyclohexane, benzene, xylene, toluene and the like.

As the organic alkali metal compound, an organolithium compound is preferred. As this organolithium compound, there may be used organomonolithium compounds, organodilithium compounds and organopolylithium compounds. Specific examples thereof include ethyllithium, n-propyllithium, isopropyllithium, n-butyllithium, sec-butyllithium, t-butyllithium, phenyllithium, hexamethylenedilithium, butadienyllithium, isoprenyldilithium and the like, and these may be used in an amount of 0.02 to 0.4 part by weight per 100 parts by weight of the monomers.

The controlling of the vinyl content of the conjugated diene compound in the blocks A and B may be effected with a Lewis base such as an ether, an amine or the like, and specific examples of the ether include tetrahydrofuran, diethyl ether, dipropyl ether, dibutyl ether, higher dialkyl ethers and ether derivatives of polyethylene glycols such as ethylene glycol dibutyl ether, diethylene glycol dimethyl ether, diethylene glycol dibutyl ether, triethylene glycol dimethyl ether and the like; and specific examples of the amine include tertiary amines such as tetramethylethylenediamine, pyridine, tributylamine and the like, and these are used together with the above organic solvents.

Moreover, the polymerization reaction is usually carried out at a temperature of −30° C. to +150° C. Also, the polymerization may be carried out while the polymerization system is kept at a constant temperature or may be carried out at an elevating temperature without removing the heat generated.

The method of forming the straight chain block copolymer may be any method; however, in general, the block A is first formed by polymerization using a polymerization initiator such as the above-mentioned organic alkali metal compound or the like, and then the block B is formed by polymerization. In this case, it is not always necessary that the boundary of each block be definitely distinguished.

To the thus obtained A-B type straight chain block copolymer, which is the component (b) before hydrogenation, can be added a polyfunctional coupling agent and the resulting mixture can be subjected to coupling reaction to obtain the block copolymer of block copolymer mixture containing the star-branched block copolymer (the component (a) before hydrogenation).

The polyfunctional coupling agent includes, for example, polyvinyl aromatic compounds such as divinylbenzene, 1,2,4-trivinylbenzene, 1,3-divinylnaphthalene, 1,8-divinylnaphthalene, 1,3,5-trivinylnaphthalene, 2,4-divinylphenyl, 3,5,4-trivinylnaphthalene, 1,2-divinyl-3,4-dimethylbenzene, 1,5,6-trivinyl-3,7-diethylnaphthalene and the like; polyepoxy compounds such as epoxidized 1,2-polybutadiene, epoxidized soy bean oil, epoxidized linseed oil, 1,2,5,6,9,10-triepoxydecane and the like; polyisocyanate compounds such as benzene-1,2,4-triisocyanate, naphthalene-1,2,5,7-tetraisocyanate, triphenylmethane triisocyanate, naphthalene-1,3,7-triisocyanate and the like; polycarboxylic acid ester compounds derived from polycarboxylic acids such as oxalic acid, malonic acid, succinic acid, adipic acid, suberic acid, itaconic acid, maleic acid, fumaric acid, glutaric acid, pimelic acid, sebacic acid, phthalic acid, terephthalic acid, diphenic acid, isophthalic acid, naphthalic acid, 1,3,5-benzenetricarboxylic acid, citric acid, trimellitic acid, pyrromellitic acid and the like and alcohols such as methyl alcohol, ethyl alcohol, n-propyl alcohol, isopropyl alcohol, n-butyl alcohol, sec-butyl alcohol, t-butyl alcohol, amyl alcohol, hexyl alcohol, octyl alcohol, benzyl alcohol and the like or phenols such as phenol, o-cresol, m-cresol, p-cresol, o-ethylphenol, m-ethylphenol, p-ethylphenol, o-methoxyphenol, m-methoxyphenol, p-methoxyphenol and the like; halides of the above polycarboxylic acids; polycarboxylic dianhydride compounds such as pyromellitic dianhydride, 2,3,6,7-naphthalenetetracarboxylic dianhydride, 1,2,5,6-naphthalenetetracarboxylic dianhydride, 3,3,4,4-benzophenonetetracarboxylic dianhydride and the like; carbonic acid ester compounds such as dimethyl carbonate, diethyl carbonate, diphenyl carbonate and the like; polyketones such as 1,3,6-hexanetrione, 2,3-diacetonylcyclohexanone and the like; polyaldehyde compounds such as 1,4,7-naphthenetricarboxyaldehyde, 1,7,9-anthracenetricarboxyaldehyde and the like; polyhalogenated hydrocarbons such as chloroform, carbon tetrachloride, bromoform, carbon tetrabromide, iodoform, tetraiodomethane, 1,1,2-trichloroethane, 1,1,2,2-tetrachloroethane, 1,1,2,2-tetrabromoethane, hexachloroethane, 1,2,3-trichloropropane, 1,2,3-tribromopropane, 1,2,4-trichloropropane, 1,2,4,5-tetrachlorobenzene, 1,4-bis(trichloromethyl)benzene and the like; silicon compounds such as trifluorosilane, trichlorosilane, methyltrichlorosilane, ethyltrichlorosilane, butyltrichlorosilane, tetrachlorosilane, tetrabromosilane, tetraiodosilane, (dichloromethyl)trichlorosilane, (dichlorophenyl)trichlorosilane, 1,2-bis(trichlorosilyl)ethane, hexachlorodisilane, octachlorotrisiloxane, trichloromethyltrichlorosilane, tetramethoxysilane, tetraethoxysilane, tetrabutoxysilane, trimethoxymethylsilane, triethoxymethylsilane, triethoxychlorosilane, diethoxychloromethylsilane, methyltriacetoxysilane and the like; tin compounds such as tetrachlorotin, methyltrichlorotin, butyltrichlorotih, tetramethoxytin and the like; germanium compounds such as tetrachlorogermanium and the like; polyaziridinyl compounds such as 2,4,6-tri(aziridinyl)-1,3,5-triazine, tri(1-aziridinyl)phosphine oxide, tri(2-methyl-1-aziridinyl)phosphine oxide and the like; etc.

Also, compounds having two or more functional groups which can react with the living polymer in the molecule such as 1,3-dichloro-2-propanone, 2,4-dibromo-3-pentanone, 1,2,4,5-diepoxy-3-pentanone, 1,2,11,12-diepoxy-8-pentadecanone and the like can be used as the above coupling agent.

Among these compounds, particularly preferable are divinylbenzene, 1,2,4-trivinylbenzene, epoxidized 1,2-polybutadiene, epoxidized soy bean oil, epoxidized linseed oil, benzene-1,2,4-triisocyanate, diethyl oxalate, diethyl malonate, diethyl adipate, dioctyl adipate, dimethyl phthalate, diethyl phthalate, diethyl terephthalate, pyromellitic dianhydride, diethyl carbonate, 1,1,2,2-tetrachloroethane, 1,4-bis(trichloromethyl)benzene, trichlorosilane, methyltrichlorosilane, butyltrichlorosilane, tetrachlorosilane, (dichloromethyl)trichlorosilane, hexachlorodisilane, tetraethoxysilane, tetrachlorotin, 1,3-dichloro-2-propanone and the like.

The content of other monomers bound in each of the above block copolymers is adjusted by controlling the amount of the monomers fed during the polymerization in each stage, and the vinyl content of the conjugated diene compound is adjusted by varying the amount of the aforementioned agent for controlling the vinyl content (microstructure-controlling agent) such as a Lewis base. Moreover, the weight average molecular weight is adjusted by varying the amount of a polymerization initiator such as n-butyllithium added. Further, the weight ratio of the hydrogenated block copolymer (a) to the hydrogenated block copolymer (b) is adjusted by varying the amount of a polyfunctional coupling agent.

The process for producing the hydrogenated block copolymer or hydrogenated block copolymer mixture in this invention is explained below in more detail. First of all, in order to obtain a block copolymer or a block copolymer comprising a star-branched block copolymer, a low vinyl content polybutadiene block which becomes the block A is formed by polymerization of 1,3-butadiene using an organolithium compound such as n-butyllithium as an initiator under vacuum or under a stream of high purity nitrogen in an organic solvent such as benzene, cyclohexane or the like as a polymerization solvent in the first stage; and thereafter a microstructure-controlling agent such as tetrahydrofuran, diethyl ether or the like and a conjugated diene compound or both the conjugated diene compound and other monomers for the second stage are added and subjected to polymerization; and after completion of the polymerization, a polyfunctional coupling agent such as divinylbenzene or the like is added to couple the A-B block polymers, thereby obtaining a star-branched block copolymer.

By hydrogenating the block copolymer thus obtained, the hydrogenated block copolymer of this invention in which substantially all the double bonds of the conjugated diene portion have been hydrogenated. That is to say, the hydrogenated block copolymer of this invention is obtained by dissolving the block copolymer obtained in such a manner as mentioned above in an inert solvent and hydrogenating the same at a temperature of 0° to 150° C. at a hydrogen pressure of 1 to 100 kg/cm$^2$G in the presence of a hydrogenating catalyst.

The inert solvent used in the hydrogenation includes hydrocarbon solvents such as hexane, heptane, cyclohexane, benzene, toluene, ethylbenzene and the like, and polar solvents such as methyl ethyl ketone, ethyl acetate, diethyl ether, tetrahydrofuran and the like.

The hydrogenating catalyst includes a catalyst for hydrogenation consisting of a dicyclopentadienyltitanium halide, a cyclopentadienyltitanium halide, a nickel carboxylate or a cobalt carboxylate and an organometallic compound of Groups I to III of the Periodic Table; a nickel, platinum, palladium, ruthenium, rhenium or rhodium metal catalyst supported on a carrier such as carbon, silica, diatomaceous earth or the like; a metal complex catalyst such as a cobalt, nickel, rhodium or ruthenium complex or the like. Also, a hydrogenated compound such as lithium aluminum hydride, p-toluenesulfonyl hydrazide or the like or a hydrogen storing alloy such as Zr—Ti—Fe—V—Cr alloy, a Zr—Ti—Nb—Fe—V—Cr alloy, a LaNi$_5$ alloy or the like can be used to effect the above hydrogenation reaction to produce the hydrogenated block copolymer of this invention.

The hydrogenation degree of the conjugated diene portion is controlled by adjusting the amount of the hydrogenation catalyst or hydride compound added, or varying the hydrogen pressure and/or reaction time during the hydrogenation reaction.

The catalyst residue is, if necessary, removed from the solution of the hydrogenated block copolymer, and an antioxidant of phenol type, amine type or the like is added, whereby the hydrogenated block copolymer can be easily isolated from the solution.

The isolation of the hydrogenated block copolymer can be carried out by a method which comprises adding acetone, an alcohol or the like to the hydrogenated block copolymer solution to precipitate the hydrogenated block copolymer, a method which comprises pouring the polymer solution into a hot water with stirring and removing the solvent of the poured solution by distillation, or other methods.

Incidentally, at least one functional group can be introduced into the hydrogenated block copolymer of this invention and the resulting modified hydrogenated block copolymer can be used in this invention. Also, in the stage of the above-mentioned production of the block copolymer before hydrogenation, a polyepoxy compound, a polyisocyanate compound, a polycarboxylic acid ester compound, a polyketone compound, a polyaldehyde compound, a polyaziridinyl compound or the like can be used as the polyfunctional coupling agent to introduce a functional group such as —OH group, —NH—CO group, —NH group or the like into the center of the molecular chain.

By blending (I) the hydrogenated block copolymer or hydrogenated block copolymer mixture of this invention (referred to hereinafter as the hydrogenated block copolymer (I) in some cases) with (II) a thermoplastic resin and/or a rubbery poller, there can be prepared a composition excellent in balance of impact resistance, heat resistance, stiffness, processibility and appearance of molded article or a thermoplastic elastomer composition excellent in mechanical properties (said compositions are referred to hereinafter as the composition (I) in some cases).

The above thermoplastic resin is not critical and includes, nonpolar thermoplastic resins such as polyethylene, high molecular weight polyethylene, high density polyethylene, medium density polyethylene, low density polyethylene, straight chain low density polyethylene (LLDPE), polypropylene, polybutene-1, polyisobutylene, high impact polystyrene (HIPS), polystyrene, polymethylene, poly-4-methylpentene-1, polyhexene and the like and polar thermoplastic resins such as ABS resin; acrylic resin; polyacrylamide; polymethacrylamide; polyacrylic acid; polyalkyl acrylates such as polymethyl acrylate, polyethyl acrylate and the like; polyalkyl methacrylates such as polymethyl methacrylate, polyethyl methacrylate and the like; polyacrylonitrile; polymethacrylonitrile; acetal resin; polyoxymethylene; chlorinated polyethylene; coumarone-indene resin; cellulose; cellulose esters; cellulose ethers; carboxymethyl cellulose; cellulose ether ester; fluoroplastics; polychlorotrifluoroethylene; polyvinylidene fluoride; polyvinyl fluoride; aliphatic polyamides such as nylon 11, nylon 12, nylon 6, nylon 6,10, nylon 6,12, nylon 6,6, nylon 4,6 and the like; aromatic polyamides such as polyphenylene isophthalamide, polyphenylene terephthalamide, polymetaxylylenediamine and the like; polyimide; polyethylene terephthalate; polybutylene terephthalate; polyphenylene ether; polyphenylene sulfide; polysulfone; polyether sulfone; polysulfonamide; polyetheretherketone; polyamideimide; polyarylates; polycarbonates; polyvinyl alcohol; polyvinyl esters; polyvinyl acetate; polymethyl vinyl ether; polyisobutylene vinyl ether; polyvinyl chloride; polyvinylidene chloride; and the like. These thermoplastic resins may be used alone or in combination of two or more.

Preferable thermoplastic resins are polyethylene, polypropylene, polystyrene, polyamide, polyacetal, polyethylene terephthalate, polybutylene terephthalate, polyphenylene ether, polyphenylene sulfide, polysulfone and polycarbonate, and more preferable thermoplastic resins are polyethylene and polypropylene.

The term "rubbery polymer" is used herein to include both natural rubbers and synthetic rubbers. Representative specific examples of the rubbery polymer include styrene-butadiene rubber and its hydrogenation product; isoprene rubber, nitrile rubber and its hydrogenation product; chloroprene rubber, butyl rubber, ethylene-propylene rubber, ethylene-propylene-diene rubber, ethylene-butene rubber, ethylene-butene-diene rubber, acrylic rubber, α,β-unsaturated nitrile-acrylate-conjugated diene copolymer rubber, chlorinated polyethylene rubber, fluororubber, silicone rubber, urethane rubber, polysulfide rubber, styrene-butadiene block copolymer and its hydrogenation product, and the like. Among these rubbery polymers, more preferable are essentially saturated rubbers and rubbers having a low unsaturation degree such as hydrogenation product of styrene-butadiene rubber, hydrogenation product of nitrile rubber, ethylene-propylene rubber, ethylene-propylene-diene rubber, ethylene-butene rubber, ethylene-butene-diene rubber, acrylic rubber, chlorinated polyethylene rubber, fluororubber, silicone rubber, urethane rubber, polysulfide rubber, hydrogenation product of styrene-butadiene block polymer, α,β-unsaturated nitrile-acrylate-conjugated diene copolymer rubber and the like and modified rubbers obtained by introducing a functional group into the above rubbers.

In the composition (I) of this invention, the proportions of the hydrogenated block copolymer (I) and the thermoplastic resin and/or rubbery polymer (II) blended are such that the amount of the hydrogenated block copolymer (I) is 1 to 99 parts by weight, preferably 2 to 95 parts by weight and more preferably 3 to 90 parts by weight and the amount of the thermoplastic resin and/or rubbery polymer (II) is 99 to 1 part by weight, preferably 98 to 5 parts by weight, and more preferably 95 to 10 parts by weight, provided that (I)+(II)= 100 parts by weight. When the amount of the hydrogenated block copolymer (I) is less than 1 part by weight, the quality-improving effect of the hydrogenated block copolymer (I) on the thermoplastic resin and/or rubbery polymer (II) becomes insufficient, while when the amount of the hydrogenated block copolymer (I) exceeds 99 parts by weight, the physical properties-improving effect of the hydrogenated block copolymer (I) when a thermoplastic elastomer composition is intended to be obtained becomes insufficient.

When it is intended to obtain a thermoplastic elastomer composition using the hydrogenated block copolymer (I) of this invention, whether the thermoplastic resin, a rubbery polymer or both thereof are used as the component (II) depends upon the properties of the above hydrogenated block copolymer (I).

More specifically, since when the proportion of the block A in the hydrogenated block copolymer (I) is 40% by weight or less, the hydrogenated block copolymer (I) is usually rubbery and soft, it is preferable to make such a design that a thermoplastic resin is blended as the component (II) to obtain a thermoplastic elastomer composition having a good balance of properties. When the content of the block A in the hydrogenated block copolymer (I) exceeds 40% by weight but is not more than 60% by weight, it is preferable to make such a design that both thermoplastic resin and rubbery polymer are used as the component (II) to obtain a collectively balanced thermoplastic elastomer. However, the design is not necessarily restricted to the above, and, for example, a very soft thermoplastic elastomer can be obtained by blending the hydrogenated block copolymer (I) having a block A content of 40% by weight or less with the rubbery polymer as the component A generalized relation between the properties of the hydrogenated block copolymer (I) and the polymer used as the component (II) is explained above in connection with the combination of the hydrogenated block copolymer (I) with the component (II); however, the composition obtained by this invention is not restricted to the above-mentioned modes and the contents of the component (II) can be selected depending upon the purpose.

The polymer used as the component (II) may be a mixture of a plurality of thermoplastic resins and/or a mixture of a plurality of rubbery polymers as well as a thermoplastic resin and/or a rubbery polymer.

Moreover, when the thermoplastic resin and the rubbery polymer are used in combination as the component (II), each of them may be used in any amount depending upon the properties of the final composition.

In addition, in this invention, it is possible to design the composition making the best use of the properties inherent to the hydrogenated block copolymer (I), namely such properties that it acts as a compatibilizing agent between different kinds of high polymers. In general, when a block copolymer is used as a compatibilizing agent, it is known that it is sufficient to add the same in an amount of several percent by weight. Why the minimum amount of the hydrogenated block copolymer (I) of this invention is 1% by weight is that the use of the hydrogenated block copolymer (I) as a compatibilizing agent is taken into consideration.

That is to say, when the hydrogenated block copolymer (I) is used as the compatibilizing agent, at least two kinds of thermoplastic resins are used or a thermoplastic resin and a rubbery polymer are used in combination.

In this case, the hydrogenated block copolymer (I) acts effectively as a compatibilizing agent on a combination of the specific thermoplastic resins or a combination of a specific thermoplastic resin with a specific rubbery polymer.

In this case, the thermoplastic resin includes, for example, polyolefin resin such as polyethylene, polypropylene, polybutene-1 and the like; graft copolymers in which a polymer comprising an α-monoolefin having 2 to 8 carbon atoms as the main constituent is grafted with another polymer; and the like. The rubbery polymer in this case includes monoolefin copolymer rubbers such as ethylene-propylene rubber, ethylene-propylene-diene rubber, ethylene-butene rubber, ethylene-butene-diene rubber and the like; chlorinated polyethylene rubber, hydrogenation product of styrene-butadiene rubber, hydrogenation product of nitrile rubber, hydrogenation product of styrene-butadiene block copolymer and the like. Even when the hydrogenated block copolymer (I) is used as a compatibilizing agent, other thermoplastic resins and/or rubbery polymers than mentioned above may be blended.

When the hydrogenated block copolymer (I) of this invention is blended with a rubbery polymer as the component (II) together with a cross-linking agent for the rubbery polymer and the resulting mixture is subjected to reaction while shear deformation is applied thereto to allow at least 10% by weight of the rubbery polymer to gel, a composition having mechanically excellent properties [referred to hereinafter as the composition (II)] is obtained.

The above-mentioned cross-linking agents may be those which are used in the cross-linking of conventional rubbers, for example, those mentioned in, for example, "Cross-Linking Agent Handbook" by Shinzo Yamashita and Tosuke Kaneko published by Taisei-sha and the like.

Preferable cross-linking agents include resin cross-linking agents such as sulfur, sulfur compounds, p-benzoquinonedioxime, p,p'-dibenzoylquinonedioxime, 4,4'-dithio-bis-dimorpholine, poly-p-dinitrosobenzene, tetrachlorobenzoquinone, alkylphenol-formaldehyde resins, brominated alkylphenol-formaldehyde resins and the like; ammonium benzoate; bismaleimide compounds; diepoxy compounds; dicarboxylic acid compounds; diol compounds; diamine compounds; amino resins; organic metal salts; metal alkoxides; organometallic compounds; organic peroxides; and the like.

These cross-linking agents can be used alone or in admixture. Also, some kinds of cross-linking agents can be used in combination with other compounds to allow the cross-linking to proceed more efficiently.

In particular, when sulfur or a sulfur compound is used as the cross-linking agent, it is preferable to use the same in combination with a vulcanization accelerator for accelerating the cross-linking reaction, an accelerator activator and an activating agent for accelerating the cross-linking reaction of sulfur. An appropriate combination, an appropriate amount and the like can be determined based on, for example, the above-mentioned literature reference.

When an organic peroxide is used as the cross-linking agent, a method in which a cross-linking coagent is co-used is preferred.

The cross-linking coagent includes sulfur; sulfur compounds such as dipentamethylenethiuram pentasulfide, mercaptobenzothiazole and the like; monomers such as oxi-menitroso compounds, ethylene glycol dimethacrylate, aryl methacrylate, triaryl cyanurate, diaryl phthalate, polyethylene glycol dimethacrylate, divinyl adipate, maleic anhydride, bismaleimide compounds, trimethylolpropane trimethacrylate, divinylbenzene and the like; polymers such as liquid polybutadiene, liquid styrene-butadiene copolymer, 1,2-polybutadiene and the like.

It is preferable to determine the cross-linking agent to be used after sufficient consideration of the properties of the rubbery polymer in the component (II); however, it is necessary to make the determination taking the following points into consideration:

That is to say, the hydrogenated block copolymer (I) of this invention can be regarded as being a substantially saturated polymer consisting essentially of α-olefins.

Accordingly, if the rubbery polymer in the component (II) is of a high unsaturation degree, a cross-linking agent effective to highly unsaturated rubber, for example, a usual sulfur-vulcanization type, a resin cross-linking type or the like can be selected to preferentially cross-link the rubbery polymer.

However, if the rubbery polymer in the component (II) is an essentially saturated polymer, particularly a copolymer rubber consisting of an α-monoolefin or a rubber having a low unsaturation degree, there is a possibility that not only the rubbery polymer but also the hydrogenated block copolymer (I) is cross-linked when a certain kind of cross-linking agent is used in a certain amount. For example, when an organic peroxide is used as the cross-linking agent in a large amount, there is a fear that even the hydrogenated block copolymer (I) may be cross-linked and the composition obtained may be insolubilized.

In such a case, the problem can be solved by sufficiently checking the amount of the cross-linking agent used; however, there is such a limit that the degree of cross-linking of the rubbery polymer cannot be made sufficiently high. This problem can be fundamentally solved by using as the rubbery polymer a polymer containing a functional group such as carboxyl group, acid anhydride group, hydroxyl group, epoxy group, halogen group, amino group, isocyanate group, sulfonyl group or sulfonate group and using as the cross-linking agent a component which can react with the functional group. The rubbery polymer containing such a functional group is prepared by copolymerizing a monomer having the functional group or introducing the functional group into the rubbery polymer by a known grafting reaction. In this case, the component used as the cross-linking agent is a polyfunctional compound which undergoes substitution reaction with the functional group in the rubbery polymer, and may be a low molecular weight compound or a high molecular weight compound.

Specifically, the rubbery polymer having a carboxyl group can easily be cross-linked with a diamino compound, bisoxazoline, a diepoxy compound, a diol compound or the like.

For the rubbery polymer having a maleic anhydride group as the functional group, a diamino compound is effective as a cross-linking agent.

Moreover, when the rubbery polymer contains unsaturations, a dithiol compound or bismaleimide can be used as the cross-linking agent.

Furthermore, when the rubbery polymer is an acrylic rubber or a polymer composed mainly of an acrylic acid ester, a diamino compound is effective.

In addition, a chlorinated polymer such as chlorinated polyethylene or the like is used as the rubbery polymer, a dithiol compound is effective as the cross-linking agent.

The amount of these cross-linking agents used can be appropriately determined depending upon the properties required for the objective final composition. The selection of an appropriate cross-linking system and the amount of the cross-linking agent used are preferably determined based on the above-mentioned literature reference and the like. Usually, a cross-linking system is appropriately used which comprises 0.1 to 8 parts by weight of a cross-linking agent, 0.1 to 10 parts by weight of a vulcanization accelerator, 0.5 to 10 parts by weight of an accelerator activator, 0.5 to 10 parts by weight of a vulcanization promoter and 0.1 to 10 parts by weight of a cross-linking coagent per 100 parts by weight of the rubbery polymer. In this case, however, it is necessary that the rubbery polymer in the component (II) has been allowed to gel in a proportion of at least 10% by weight, preferably at least 30% by weight and more preferably at least 40% by weight. When the gel proportion is less than 10% by weight, the enhancement of the mechanical properties by the cross-linking becomes insufficient, so that such a proportion is not desirable.

In this case, the gel content of the rubbery polymer is indicated by the gel content of the cross-linked rubbery polymer obtained by conducting a cross-linking test of only the rubbery polymer under the same conditions as in the preparation of the composition (II). This measurement of gel content is usually effected by subjecting the rubbery polymer to extraction with cyclohexane as a solvent at 70° C. for four hours and the gel content is calculated from the extraction result; however, when the rubbery polymer used is insoluble in cyclohexane, a good solvent for the rubbery polymer is substituted for the cyclohexane.

The composition of this invention comprises (I) the hydrogenated block copolymer of this invention and (II) a thermoplastic resin and/or a rubbery polymer as mentioned above; however, when the composition contains 10% by weight or more of the thermoplastic resin as the component (II), a composition having mechanically excellent properties [referred to hereinafter as the composition (III)] is obtained by reacting the hydrogenated block copolymer (I) with the component (II) in the presence of a cross-linking agent capable of cross-linking the hydrogenated block copolymer (I) under shear deformation to allow at least 10% by weight of the total weight of the rubbery polymer and the hydrogenated block copolymer (I) to gel.

The composition (III) is prepared by subjecting the composition (I) containing at least 10% by weight of the thermoplastic resin as the component (II) to shear deformation (melt-mixing) in the presence of a component capable of cross-linking the hydrogenated block copolymer (I) and the rubbery polymer to allow the hydrogenated block copolymer (I) and the rubbery polymer to gel in a proportion of at least 10% by weight of the total weight of the two.

That is to say, the composition (III) is characterized by using the hydrogenated block copolymer (I) of this invention as a rubber component.

In the composition (III), it is necessary to use a thermoplastic resin as the component (II), and the amount of the thermoplastic resin used is at least 10% by weight, preferably 10 to 80% by weight and more preferably 15 to 70% by weight, based on the weight of the component (II), and when the amount is less than 10% by weight, the composition obtained loses its thermoplasticity and becomes inferior in processibility.

The thermoplastic resin used in the composition (III) is preferably a crystalline, thermoplastic olefinic polymer such as polyethylene, polypropylene, polybutene-1, polyamide, polyester, polyamide elastomer, polyester elastomer or the like.

The cross-linking agent used in this case can be appropriately selected from the cross-linking agents used in the composition (II).

In the composition (III), it follows that the hydrogenated block copolymer (I) which is an essentially saturated olefinic block copolymer is used as a rubber component, and hence, the cross-linking agent is preferably a system consisting of an organic peroxide and a cross-linking coagent.

Said organic peroxide is preferably one whose one-minute half-life temperature is 150° C. or more, and preferable examples thereof are 2,5-dimethyl-2,5-dibenzoylperoxyhexane, n-butyl-4,4-di-t-butyl peroxyvalerate, dicumyl peroxide, t-butyl peroxybenzoate, di-t-butylperoxy-diisopropylbenzene, t-butylcumyl peroxide, 2,5-dimethyl-2,5-di-t-butylperoxyhexane, di-t-butyl peroxide, 2,5-dimethyl-2,5-di-t-butylperoxyhexyne-3 and the like.

The cross-linking coagent used is preferably a radically polymerizable monomer or a radically cross-linkable polymer. This cross-linking coagent is preferably divinylbenzene, bismaleimide, trimethylolpropane triacrylate, trimethylolpropane methacrylate, pentaerythritol triacrylate, aluminum acrylate, aluminum methacrylate, zinc methacrylate, zinc acrylate, magnesium acrylate, magnesium methacrylate, triallyl isocyanurate, triallyl cyanurate, triallyl trimellitate, diallyl phthalate, diallyl chlorendate, liquid polybutadiene, liquid 1,2-polybutadiene or the like.

The organic peroxide is preferably added in such an amount that the oxygen amount of the organic peroxide is 0.001 to 0.1 mole per 100 parts by weight of the hydrogenated block copolymer (I) or a total of the hydrogenated block copolymer (I) and the rubbery polymer, and when the oxygen amount is less than 0.001 mole, sufficient cross-linking is not caused. On the other hand, even when the organic peroxide is used in an oxygen amount of more than 0.1 mole, no more cross-linking can be expected and hence such an amount is not economical. In addition, in this case, undesirable side reactions, for example, decomposition of polymer and the like, tend to be caused.

The cross-linking coagent is preferably used in such an amount that the amount of the double bond in the cross-linking coagent becomes ¼ to 40 equivalents per equivalent of active oxygen in the organic peroxide added. When the amount is less than ¼ equivalent, an increase of cross-linking degree due to the addition of a cross-linking coagent cannot be so expected, and a sufficient cross-linking is not caused. On the other hand, even when the cross-linking coagent is used in excess of the 40 equivalents per equivalent of active oxygen in the organic peroxide, no more cross-linking can be expected and such an amount is not economical.

The gel content of the hydrogenated block co-polymer (I) or both the hydrogenated block copolymer (I) and the rubbery polymer in the component (II) may be replaced by the gel content obtained by conducting a cross-linking test of only the hydrogenated block copolymer (I) or both the hydrogenated block copolymer (I) and only the rubbery polymer in the component (II) under the same conditions as in the preparation of the composition (III).

In this case, the gel content is determined usually by subjecting to extraction with cyclohexane as a solvent at 70° C. for four hours and calculating the gel content from the insolubles obtained. However, when the rubbery polymer used is insoluble in cyclohexane, the solubles of the hydrogenated block copolymer (I) in cyclohexane are first removed and then extraction with a good solvent for the rubbery polymer is effected again to determine the gel content.

In the production of the composition containing the hydrogenated block copolymer (I) and the thermoplastic resin and/or rubbery polymer [namely, the composition (I), (II) or (III)], a conventional kneading means such as rubber mill, Brabender mixer, Banbury mixer, pressure kneader, twin screw extruder or the like may be used and may be of the internal type or open type; however, it is preferably of such a type that substitution of an inert gas is possible.

Incidentally, the kneading temperature is a temperature at which the components to be mixed are all melted, and usually ranges from 140° to 300° C. preferably from 160° to 280° C. The kneading time may be varied depending upon the kinds and amounts of the constituents and the kneading means and cannot be determined uniquely; however, when a pressure kneader, a Banbury mixer or the like is used as the kneading means, the kneading time is usually about 5 to 40 minutes.

Moreover, in the above kneading, all the constituents may be added at one time and kneaded or a multistage kneading method in which some of the constituents may first kneaded and thereafter the remainder is added and kneaded may be adopted.

To the composition (I), (II) or (III) may, if necessary, be added various additives, for example, stabilizers such as antioxidant, thermal stabilizer, ultraviolet absorber, copper-harm preventing agent and the like; fillers such as silica, talc, carbon, calcium carbonate, magnesium carbonate, glass fiber, carbon fiber, metal fiber, glass beads, mica, potassium titanate whisker, aramid fiber, wood flour, cork powder, cellulose powder, rubber powder and the like; etc.

The amount of these fillers added is preferably 200 parts or less, more preferably 1 to 150 parts by weight and most preferably 5 to 100 parts by weight, per 100 parts by weight of the hydrogenated block copolymer (I) or the composition (I), (II) or (III).

Moreover, in addition to the above additives, a softening agent such as a plasticizer, an oil, a low molecular weight polymer or the like may be added to the composition (I), (II) or (III).

When the softening agent is added, the amount thereof is preferably 1 to 400 parts by weight, more preferably 5 to 300 parts by weight and most preferably 10 to 200 parts by weight, per 100 parts by weight of a total weight of the hydrogenated block copolymer (I) and the component (II).

Preferable working modes of this invention are the following (i) to (viii):

(i) The thermoplastic resin in the component (II) is at least one member selected from the group consisting of polyolefin, polystyrene, polyamide, polyacetal, polyester, polyphenylene ether, polyphenylene sulfide, polysulfone and polycarbonate.

(ii) The rubbery polymer in the component (II) is at least one member selected from the group consisting of nitrile rubber, hydrogenation product of nitrile rubber, hydrogenation product of styrene-butadiene rubber, ethylene-propylene-(diene) rubber, ethylene-butene rubber, acrylic rubber and hydrogenation product of styrene-conjugated diene block copolymer.

(iii) A thermoplastic elastomer composition obtained by subjecting the hydrogenated block copolymer (I) and the rubbery polymer as the component (II) together with a cross-linking agent for the rubbery polymer to reaction under shear deformation to allow at least 10% by weight of the rubbery polymer to gel.

(iv) A thermoplastic elastomer composition obtained by subjecting the hydrogenated block copolymer (I) and the component (II) containing at least 10% by weight of the thermoplastic resin to reaction in the presence of a cross-linking agent under shear deformation to allow at least 10% by weight of the total weight of the hydrogenated block copolymer and the rubbery polymer to gel.

(v) The composition in (iv) above wherein the organic peroxide is contained in an amount corresponding to 0.001 to 0.1 mole of oxygen in organic peroxide per 100 parts by weight of the component (II).

(vi) A composition comprising the hydrogenated block copolymer (I), the component (II) and a filler in a proportion of 1 to 150 parts by weight per 100 parts by weight of a total of the hydrogenated block copolymer (I) and the component (II).

(vii) A composition comprising the hydrogenated block copolymer (I), the component (II) and a softening agent in a proportion of 1 to 400 parts by weight per 100 parts by weight of a total of the hydrogenated block copolymer (I) and the component (II).

According to this invention, there is obtained a pelletizable hydrogenated block copolymer containing a star-branched structure which is excellent in various characteristics such as heat resistance, weather resistance, flow properties and the like; exhibits, when used as a quality-improver for other thermoplastic resins, excellent improving effects on impact resistance, heat resistance, stiffness, processibility, appearance of molded article and the like; and can give, when blended with a rubbery polymer, a thermoplastic elastomer having excellent mechanical properties.

Also, according to this invention, there can be obtained a hydrogenated block copolymer composition by blending the hydrogenated block copolymer (I) with a thermoplastic resin and/or a rubbery polymer, said composition is excellent in balance of impact resistance, heat resistance, stiffness, processibility, appearance of molded article and the like, or a thermoplastic elastomer composition having excellent mechanical properties.

The composition of this invention can be molded into various molded articles by injection molding, extrusion molding, vacuum molding or the like and can be widely used as an automobile internal or external trim material, various electric and electronic parts, housing, industrial parts, stationery, pharmaceutical members, film-sheet article, sticking agent, adhesive and the like by making the best use of its excellent characteristics.

DESCRIPTION OF PREFERRED EMBODIMENTS

This invention is explained in more detail below referring to Examples; however, this invention should not be construed to be restricted thereto.

Incidentally, in the Examples, parts and % are by weight unless otherwise specified. Various measurements in the Examples were conducted according to the following methods:

Vinyl content

The vinyl content of the conjugated diene was calculated by the Hampton method using an infrared analysis.

Hydrogenation degree

The hydrogenation degree of the conjugated diene was calculated from $^1$H-NMR spectrum at 100 MHz using ethylene tetrachloride as a solvent.

Weight average molecular weight

The weight average molecular weight (referred to hereinafter as merely the molecular weight in some cases) was determined as a polystyrene-reduced molecular weight by gel permeation chromatography (GPC) (column: $GMH_{HR}$-H manufactured by TOSOH CORP.).

Weight ratio of the component (a) to the component (b)

The weight ratio of the component (a) to the component (b) was calculated from the ratio of the peak areas of the component (a) and the component (b) obtained by the above-mentioned GPC.

Melt flow rate

The melt flow rate (MFR) was measured according to JIS K7210 at 230° C. under a load of 10 kg (Examples 10 to 18 and Comparative Examples 10 to 19) or under a load of 2.16 kg (Examples 19 to 28 and 34 to 43 and Comparative Examples 20 to 31 and 36 to 48).

Blocking resistance of pellets

Pellets of a hydrogenated block copolymer (referred to hereinafter as the hydrogenated polymer in some cases) were obtained by a strand cut system at a resin temperature of 230° C. using a 55-mm φ single screw extruder. The blocking resistance of the pellets obtained was rated as follows based on the lump of pellets obtained by placing the pellets in a constant temperature bath at 50° C. under a load of 30 g/cm² for 24 hours:

A: Little hardened and easily separated.

B: Slightly hardened but could be relatively easily loosened.

C: Hardened and difficult to loosen.

Izod impact strength

Measured according to JIS K7110.

Flexural modulus

Measured according to JIS K7203

Heat distortion temperature

Measured according to ASTM D648

Appearance of molded article

The appearance of molded article was visually evaluated based on the following criteria:

A: Appearance was extremely good.

B: Appearance was good.

C: Such bad appearance phenomena that pearl luster and flow mark were found and the surface was rough were observed.

Tensile strength, elongation at break, permanent elongation at 100% elongation and hardness Measured according to JIS K6301.

EXAMPLE 1

(Production of hydrogenated block copolymer)

In a 10-liter autoclave were placed 5 kg of degased and dehydrated cyclohexane and 150 g of 1,3-butadiene, and thereafter, 0.25 g of tetrahydrofuran and 2.00 g of n-butyllithium were added thereto, after which the resulting mixture was subjected to isothermal polymerization at a constant polymerization temperature of 80° C. When the conversion reached approximately 100%, the reaction mixture was cooled to 40° C. and 8.5 g of tetrahydrofuran and 850 g of 1,3-butadiene were added to the reaction mixture, after which the resulting mixture was subjected to temperature-elevating polymerization.

After completion of the polymerization, 0.93 g of tetrachlorosilane was added to the reaction mixture and the mixture was subjected to reaction for about 20 minutes. After completion of the reaction, the amount of the living Li was measured to find that it was 7.8 millimoles. To this system was added 1.42 g of benzophenone in the autoclave and the resulting mixture was stirred for ten minutes. From the change of color of the polymer solution, it was confirmed that no polymer terminal lithium living as a living anion was present.

Subsequently, 2.64 g of benzophenone dissolved in 20 ml of cyclohexane was reacted with 0.90 g of n-butyllithium for ten minutes in a nitrogen atmosphere, after which the reaction mixture obtained was charged into the autoclave. Further, a mixture obtained by previously mixing 0.52 g of bis(cyclopentadienyl)titanium dichloride with 1.51 g of diethylaluminum chloride dissolved in 10 ml of toluene in a nitrogen atmosphere was charged into the autoclave and the resulting mixture was stirred. A hydrogen gas was fed at a pressure of 8 kg/cm²G and hydrogenation was conducted at 90° C. for 1.5 hours.

The hydrogenation degree of the hydrogenated polymer obtained was 98%, the weight average molecular weight of the component (a) was 49,000, the weight average molecular weight of the component (b) was 196,000, the weight average molecular weight of the total of the components (a) and (b) was 182,000, and the component (a)/component (b) weight ratio was 70/30.

The 1,2-vinyl content of the 1,3-butadiene block measured at the time of completion of 1,3-butadiene block polymerization in the first stage was 15%, and the 1,2-vinyl content of 1,3-butadiene block in the second stage was calculated at 40% from the 1,2-vinyl content in the first stage and the 1,2-vinyl content measured at the time of completion of the polymerization of 1,3-butadiene in the second stage. This hydrogenated block copolymer was referred to hereinafter as H-1.

EXAMPLES 2 TO 9

The same procedure as in Example 1 was repeated, except that the monomer species, monomer amount, catalyst amount, coupling agent species, coupling agent amount, polymerization temperature, polymerization time and the like were varied as shown in Tables 1 and 2 to produce hydrogenated block copolymers. The results obtained are shown in Tables 1 and 2.

TABLE 1

|  | Example 1 | Example 2 | Example 3 | Example 4 | Example 5 |
|---|---|---|---|---|---|
| Name of hydrogenated polymer | H-1 | H-2 | H-3 | H-4 | H-5 |
| Molecular structure |  |  |  |  |  |
| <Block A> 1,2-Vinyl content (%) | 15 | 15 | 14 | 14 | 16 |

TABLE 1-continued

|  | Example 1 | Example 2 | Example 3 | Example 4 | Example 5 |
|---|---|---|---|---|---|
| <Block B> Conjugated diene compd. | | | | | |
| Species | 1,3-Buta-diene | 1,3-Buta-diene | 1,3-Buta-diene | 1,3-Buta-diene | 1,3-Buta-diene |
| Vinyl content (%) | 40 | 42 | 39 | 39 | 40 |
| Other monomer | | | | | |
| Species | — | — | — | — | — |
| Content (%) | — | — | — | — | — |
| Block A/block B wt. ratio | 15/85 | 40/60 | 15/85 | 15/85 | 45/55 |
| Species of coupling agent | Tetrachloro-silane | Diethyl adipate | Epoxidized linseed oil | Epoxidized 1,2-poly-butadiene | Divinyl benzene |
| (a)/(b) molecular weight (×10,000) | 20.2/6.5 | 23.6/8.1 | 26.8/10.7 | 34.5/7.5 | 46.4/5.7 |
| (a) + (b) molecular weight (×10,000) | 18.5 | 23.0 | 20.8 | 31.1 | 44.4 |
| (a)/(b) weight ratio | 70/30 | 90/10 | 40/60 | 60/40 | 70/30 |
| Hydrogenation degree (%) | 98 | 97 | 99 | 98 | 98 |

TABLE 2

|  | Example 6 | Example 7 | Example 8 | Example 9 |
|---|---|---|---|---|
| Name of hydrogenated polymer | H-6 | H-7 | H-8 | H-9 |
| Molecular structure | | | | |
| <Block A> 1,2-Vinyl content (%) | 15 | 13 | 14 | 14 |
| <Block B> Conjugated diene compd. | | | | |
| Species | Isoprene | Isoprene | 1,3-Butadiene | 1,3-Butadiene |
| Vinyl content (%) | 40 | 40 | 39 | 60 |
| Other monomer | | | | |
| Species | — | Styrene | Styrene | — |
| Content (%) | — | 15 | 15 | — |
| Block A/block B wt. ratio | 15/85 | 15/85 | 15/85 | 15/85 |
| Species of coupling agent | 1,1,2,2-Tetrachloro-ethane | Trichloro-silane | Tetrachloro-silane | Diethyl adipate |
| (a)/(b) molecular weight (×10,000) | 19.5/6.3 | 22.3/8.9 | 27.2/9.4 | 33.7/11.6 |
| (a) + (b) molecular weight (×10,000) | 17.2 | 20.3 | 26.5 | 29.6 |
| (a)/(b) weight ratio | 60/40 | 70/30 | 90/10 | 60/40 |
| Hydrogenation degree (%) | 96 | 96 | 97 | 99 |

COMPARATIVE EXAMPLES 1 TO 9

The same procedure as in Example 1 was repeated, except that the monomer species, monomer amount, catalyst amount, coupling agent species, coupling agent amount, polymerization temperature, polymerization time and the like were varied as shown in Tables 3 and 4, to produce hydrogenated block copolymers. The results obtained are shown in Tables 3 and 4.

TABLE 3

|  | Comparative Example 1 | Comparative Example 2 | Comparative Example 3 | Comparative Example 4 | Comparative Example 5 |
| --- | --- | --- | --- | --- | --- |
| Name of hydrogenated polymer | K-1 | K-2 | K-3 | K-4 | K-5 |
| Molecular structure |  |  |  |  |  |
| <Block A> |  |  |  |  |  |
| 1,2-Vinyl content | 30 | 13 | 15 | — | 14 |
| <Block B> |  |  |  |  |  |
| Conjugated diene compd. |  |  |  |  |  |
| Species | 1,3-Butadiene | 1,3-Butadiene | — | 1,3-Butadiene | 1,3-Butadiene |
| Vinyl content (%) | 40 | 20 | — | 42 | 39 |
| Other monomer |  |  |  |  |  |
| Species | — | — | — | — | — |
| Content (%) | — | — | — | — | — |
| Block A/block B wt. ratio | 15/85 | 15/85 | 100/0 | 0/100 | 15/85 |
| Species of coupling agent | Tetrachlorosilane | Tetrachlorosilane | Diethyl adipate | Diethyl adipate | Epoxidized 1,2-polybutadiene |
| (a)/(b) molecular weight (×10,000) | 19.5/6.3 | 19.8/6.4 | 24.0/8.2 | 24.0/8.1 | 5.4/1.2 |
| (a) + (b) molecular weight (×10,000) | 17.9 | 18.2 | 23.4 | 23.4 | 4.9 |
| (a)/(b) weight ratio | 70/30 | 70/30 | 90/10 | 90/10 | 60/40 |
| Hydrogenation degree (%) | 98 | 98 | 97 | 98 | 97 |

TABLE 4

|  | Comparative Example 6 | Comparative Example 7 | Comparative Example 8 | Comparative Example 9 |
| --- | --- | --- | --- | --- |
| Name of hydrogenated polymer | K-6 | K-7 | K-8 | K-9 |
| Molecular structure |  |  |  |  |
| <Block A> |  |  |  |  |
| 1,2-Vinyl content | 14 | 14 | 14 | 16 |
| <Block B> |  |  |  |  |
| Conjugated diene compd. |  |  |  |  |
| Species | 1,3-Butadiene | 1,3-Butadiene | 1,3-Butadiene | 1,3-Butadiene |
| Vinyl content (%) | 39 | 39 | 41 | 40 |
| Other monomer |  |  |  |  |
| Species | — | — | — | — |
| Content (%) | — | — | — | — |
| Block A/block B wt. ratio | 15/85 | 15/85 | 15/85 | 45/55 |
| Species of coupling agent | Epoxidized 1,2-polybutadiene | — | 1,2-Dibromoethane | Divinyl benzene |
| (a)/(b) molecular weight (×10,000) | 99.3/22.1 | —/7.5 | 35.5/17.8 | 46.4/5.8 |
| (a) + (b) molecular weight (×10,000) | 89.3 | 7.5 | 31.1 | 44.3 |
| (a)/(b) weight ratio | 60/40 | 0/100 | 60/40 | 70/30 |
| Hydrogenation degree (%) | 97 | 98 | 98 | 68 |

Incidentally, K-1 and K-2 are the same as the hydrogenated block copolymer H-1 in Example 1, except that the 1,2-vinyl content of the block A and the vinyl content of the block B, respectively, are outside the scope of this invention.

K-3 or k-4 is the same as the hydrogenated block copolymer H-2 in Example 2, except that the block A or the block B, respectively, is not contained in the hydrogenated block copolymer.

K-5 or K-6 is the same as the hydrogenated block copolymer H-4 in Example 4, except that the weight average molecular weight of the hydrogenated block copolymer is outside the scope of this invention.

K-7 is the same as the hydrogenated block copolymer H-4 in Example 4, except that the coupling reaction was not effected.

K-8 is an example in which 1,2-dibromoethane which is difunctional was used as the coupling agent and hence the hydrogenated, star-branched block copolymer which is the component (a) is not contained.

K-9 is the same as the hydrogenated block copolymer H-5 in Example 5, except that the hydrogenation degree of the hydrogenated block copolymer is outside the scope of this invention.

EXAMPLE 10

(production of hydrogenated block copolymer)

In a 10-liter autoclave were placed 5 kg of degased and dehydrated cyclohexane and 200 g of 1,3-butadiene, and thereafter, 0.25 g of tetrahydrofuran and 1.95 g of n-butyllithium were added thereto, after which the resulting mixture was subjected to isothermal polymerization at a constant polymerization temperature of 80° C. When the conversion reached approximately 100%, the reaction mixture was cooled to 40° C. and 8.5 g of tetrahydrofuran and 800 g of 1,3-butadiene were added to the reaction mixture, after which the resulting mixture was subjected to temperature-elevating polymerization.

After completion of the polymerization, 1.04 g of tetrachlorosilane was added to the reaction mixture and the mixture was subjected to reaction for about 20 minutes. After completion of the reaction, the amount of the living Li was measured to find that it was 4.6 millimoles. To this system was added 0.84 g of benzophenone in the autoclave and the resulting mixture was stirred for ten minutes. From the change of color of the polymer solution, it was confirmed that no polymer terminal lithium which lived as a living anion was present.

Subsequently, 3.22 g of benzophenone dissolved in 20 ml of cyclohexane was reacted with 1.10 g of n-butyllithium for ten minutes in a nitrogen atmosphere, after which the reaction mixture obtained was charged into the autoclave. Further, a mixture obtained by previously mixing 0.52 g of bis(cyclopentadienyl)titanium dichloride with 1.51 g of diethylaluminum chloride dissolved in 10 ml of toluene in a nitrogen atmosphere was charged into the autoclave and the resulting mixture was stirred. A hydrogen gas was fed at a pressure of 8 kg/cm$^2$G and hydrogenation was conducted at 90° C. for 1.5 hours.

The hydrogenation degree of the hydrogenated polymer obtained was 98%, the weight average molecular weight of the component (a) was 206,000, the weight average molecular weight of the component (b) was 66,000, the weight average molecular weight of the total of the components (a) and (b) was 196,000, and the component (a)/component (b) weight ratio was 80/20. MFR measured at 230° C. under a load of 10 kg was 7.4 g/10 minutes. The 1,2-vinyl content of the 1,3-butadiene block measured at the time of completion of 1,3-butadiene block polymerization in the first stage was 15%, and the 1,2-vinyl content of 1,3-butadiene block in the second stage was calculated at 40% from the 1,2-vinyl content in the first stage and the 1,2-vinyl content measured at the time of completion of the polymerization of 1,3-butadiene in the second stage. This hydrogenated block copolymer is referred to hereinafter as H-10.

EXAMPLES 11 TO 18

The same procedure as in Example 10 was repeated, except that the monomer species, monomer amount, catalyst amount, coupling agent species, coupling agent amount, polymerization temperature, polymerization time and the like were varied as shown in Tables 5 and 6 to produce hydrogenated block copolymers. The results obtained are shown in Tables 5 and 6.

TABLE 5

| | Example 10 | Example 11 | Example 12 | Example 13 | Example 14 |
|---|---|---|---|---|---|
| Name of hydrogenated polymer | H-10 | H-11 | H-12 | H-13 | H-14 |
| Molecular structure | | | | | |
| <Block A> | | | | | |
| 1,2-Vinyl content (%) | 15 | 16 | 15 | 15 | 14 |
| <Block B> | | | | | |
| Conjugated diene compd. | | | | | |
| Species | 1,3-Butadiene | 1,3-Butadiene | 1,3-Butadiene | 1,3-Butadiene | 1,3-Butadiene |
| Vinyl content (%) | 40 | 38 | 41 | 40 | 39 |
| Other monomer | | | | | |
| Species | — | — | — | — | — |
| Content (%) | — | — | — | — | — |
| Block A/block B wt. ratio | 20/80 | 40/60 | 20/80 | 20/80 | 45/55 |
| Species of coupling agent | Tetrachlorosilane | Diethyl adipate | Epoxidized 1,2-poly- | Epoxidized linseed oil | Divinyl benzene |

TABLE 5-continued

|  | Example 10 | Example 11 | Example 12 | Example 13 | Example 14 |
|---|---|---|---|---|---|
|  |  |  | butadiene |  |  |
| (a)/(b) molecular weight (×10,000) | 20.6/6.6 | 23.2/8.0 | 15.0/3.3 | 32.6/12.9 | 48.6/6.0 |
| (a) + (b) molecular weight (×10,000) | 19.6 | 22.6 | 14.4 | 30.8 | 47.7 |
| (a)/(b) weight ratio | 80/20 | 89/11 | 80/20 | 80/20 | 85/15 |
| Hydrogenation degree (%) | 98 | 99 | 98 | 97 | 98 |
| MFR (g/10 min) | 7.4 | 4.3 | 38 | 3.0 | 11 |
| Blocking resistance of pellet | A | A | A | A | A |

TABLE 6

|  | Example 15 | Example 16 | Example 17 | Example 18 |
|---|---|---|---|---|
| Name of hydrogenated polymer | H-15 | H-16 | H-17 | H-18 |
| Molecular structure |  |  |  |  |
| <Block A> |  |  |  |  |
| 1,2-Vinyl content (%) | 16 | 15 | 14 | 15 |
| <Block B> |  |  |  |  |
| Conjugated diene compd. |  |  |  |  |
| Species | Isoprene | Isoprene | 1,3-Buta-diene | 1,3-Buta-diene |
| Vinyl content (%) | 40 | 38 | 39 | 60 |
| Other monomer |  |  |  |  |
| Species | — | Styrene | Styrene | — |
| Content (%) | — | 15 | 15 | — |
| Block A/block B wt. ratio | 20/80 | 20/80 | 20/80 | 20/80 |
| Species of coupling agent | Tetrachloro-silane | 1,1,2,2-Tetrachloro-ethane | Trichloro-silane | Epoxidized 1,2-poly-butadiene |
| (a)/(b) molecular weight (×10,000) | 18.6/6.1 | 23.4/7.9 | 25.6/10.2 | 30.7/6.8 |
| (a) + (b) molecular weight (×10,000) | 17.7 | 22.8 | 24.3 | 30.1 |
| (a)/(b) weight ratio | 80/20 | 90/10 | 81/19 | 90/10 |
| Hydrogenation degree (%) | 96 | 97 | 99 | 99 |
| MFR (g/10 min) | 12 | 6.4 | 4.6 | 8.2 |
| Blocking resistance of pellet | A | A | A | A |

COMPARATIVE EXAMPLE 10 TO 18, EXAMPLE 19

The same procedure as in Example 10 was repeated, except that the monomer species, monomer amount, catalyst amount, coupling agent species, coupling agent amount, polymerization temperature, polymerization time and the like were varied as shown in Tables 7 and 8, to produce hydrogenated block copolymers. The results obtained are shown in Tables 7 and 8.

TABLE 7

|  | Comparative Example 10 | Comparative Example 11 | Comparative Example 12 | Comparative Example 13 | Comparative Example 14 |
|---|---|---|---|---|---|
| Name of hydrogenated polymer | K-10 | K-11 | K-12 | K-13 | K-14 |
| Molecular structure |  |  |  |  |  |
| <Block A> |  |  |  |  |  |
| 1,2-Vinyl content (%) | 30 | 15 | 16 | — | 15 |
| <Block B> |  |  |  |  |  |
| Conjugated diene compd. |  |  |  |  |  |
| Species | 1,3-Butadiene | 1,3-Butadiene | — | 1,3-Butadiene | 1,3-Butadiene |
| Vinyl content (%) | 40 | 20 | — | 38 | 40 |
| Other monomer |  |  |  |  |  |
| Species | — | — | — | — | — |
| Content (%) | — | — | — | — | — |
| Block A/block B wt. ratio | 20/80 | 20/80 | 100/0 | 0/100 | 20/80 |
| Species of coupling agent | Tetrachlorosilane | Tetrachlorosilane | Diethyl adipate | Diethyl adipate | Epoxidized linseed oil |
| (a)/(b) molecular weight (×10,000) | 20.3/7.0 | 20.6/6.6 | 23.2/7.7 | 23.4/7.8 | 4.5/1.8 |
| (a) + (b) molecular weight (×10,000) | 19.5 | 19.9 | 22.6 | 22.8 | 4.3 |
| (a)/(b) weight ratio | 84/16 | 85/15 | 89/11 | 89/11 | 80/20 |
| Hydrogenation degree (%) | 98 | 98 | 99 | 99 | 98 |
| MFR (g/10 min) | 9.1 | 5.3 | 2.9 | 6.1 | >70 |
| Blocking resistance of pellet | C | A | A | C | Not pelletized |

TABLE 8

|  | Comparative Example 15 | Comparative Example 16 | Example 19 | Comparative Example 17 | Comparative Example 18 |
|---|---|---|---|---|---|
| Name of hydrogenated polymer | K-15 | K-16 | H-19 | K-17 | K-18 |
| Molecular structure |  |  |  |  |  |
| <Block A> |  |  |  |  |  |
| 1,2-Vinyl content (%) | 15 | 15 | 15 | 14 | 14 |
| <Block B> |  |  |  |  |  |
| Conjugated diene compd. |  |  |  |  |  |
| Species | 1,3-Butadiene | 1,3-Butadiene | 1,3-Butadiene | 1,3-Butadiene | 1,3-Butadiene |
| Vinyl content (%) | 40 | 41 | 40 | 39 | 39 |
| Other monomer |  |  |  |  |  |
| Species | — | — | — | — | — |
| Content (%) | — | — | — | — | — |
| Block A/block B wt. ratio | 20/80 | 20/80 | 20/80 | 20/80 | 45/55 |
| Species of coupling agent | Epoxidized linseed oil | — | Epoxidized 1,2-polybutadiene | 1,2-Dibromoethane | Divinyl benzene |
| (a)/(b) molecular weight (×10,000) | 92.7/37.1 | —/5.4 | 32.7/7.3 | 31.6/15.8 | 48.6/6.0 |
| (a) + (b) molecular weight (×10,000) | 87.6 | 5.4 | 32.5 | 29.8 | 47.7 |
| (a)/(b) weight ratio | 80/20 | 0/100 | 97/3 | 80/20 | 85/15 |
| Hydrogenation | 97 | 98 | 98 | 97 | 69 |

TABLE 8-continued

|  | Comparative Example 15 | Comparative Example 16 | Example 19 | Comparative Example 17 | Comparative Example 18 |
|---|---|---|---|---|---|
| degree (%) |  |  |  |  |  |
| MFR (g/10 min) | <0.1 | >70 | 1.6 | 1.7 | 23 |
| Blocking resistance of pellet | Not pelletized | Not pelletized | A | A | C |

Incidentally, K-10 or K-11 is the same as the hydrogenated block copolymer H-10 in Example 10, except that the 1,2-vinyl content of the block A or the vinyl content of the block B, respectively, is outside the scope of this invention.

K-12 or k-13 is the same as the hydrogenated block copolymer H-11 in Example 11, except that the block A or the block B, respectively, is not contained in the hydrogenated block copolymer.

K-14 or K-15 is the same as the hydrogenated block copolymer H-13 in Example 13, except that the weight average molecular weight of the hydrogenated block copolymer is outside the scope of this invention.

K-16 is the case where the hydrogenated block copolymer consists only of the component (b).

H-19 is an example in which the component (a)/component (b) weight ratio is 97/3.

K-17 is an example in which 1,2-dibromoethane which is difunctional was used as the coupling agent and hence the hydrogenated, star-branched block copolymer which is the component (a) is not contained.

K-18 is the same as the hydrogenated block copolymer H-14 in Example 14, except that the hydrogenation degree of the hydrogenated block copolymer is outside the scope of this invention.

Examples 10 to 18 are concerned with the hydrogenated block copolymers of this invention, and when the polymer is pelletized, the resulting pellets do not cause blocking to one another, and as shown in Examples 35 et seq., when they are blended with other resins, the quality-improving effect aimed at in this invention is obtained. On the other hand, in Comparative Examples 10, 13 and 18, blocking to one another is caused. Further, in Comparative Examples 14 to 16, pelletization is impossible, and in Comparative Examples 11, 12 and 17, blocking of pellets to one another is not caused but as shown in Comparative Examples 29 et seq., when it is blended with other resins, the quality-improving effect is inferior to that of the hydrogenated block copolymer of this invention.

EXAMPLES 20 TO 29

Each of the hydrogenated block copolymers H-1 to H-9 obtained in Examples 1 to 9 was mixed with a polypropylene resin (PP-1), talc and an ethylene-propylene copolymer (EP) (EP02P manufactured by Japan Synthetic Rubber Co., Ltd.) in the proportions shown in Tables 9 and 10 using a 4-liter Banbury mixer type kneader. Each composition obtained was formed into a sheet and then cut to square pellets, and the pellets were injection molded to prepare a test pieces for evaluating physical properties. The results of evaluation of physical properties are shown in Tables 9 and 10. These Examples are all compositions in which the hydrogenated block copolymer of this invention is used and are excellent in balance of processibility, impact resistance, stiffness, heat resistance and appearance of molded article.

TABLE 9

|  | Example 20 | Example 21 | Example 22 | Example 23 | Example 24 |
|---|---|---|---|---|---|
| <Compounding recipe> |  |  |  |  |  |
| Hydrogenated polymer |  |  |  |  |  |
| Kind | H-1 | H-2 | H-3 | H-4 | H-5 |
| Amount (part) | 15 | 15 | 15 | 15 | 15 |
| Thermoplastic resin |  |  |  |  |  |
| Kind | PP-1 | PP-1 | PP-1 | PP-1 | PP-1 |
| Amount (part) | 65 | 65 | 65 | 65 | 65 |
| Talc (part) | 20 | 20 | 20 | 20 | 20 |
| <Physical properties of injection-molded article> |  |  |  |  |  |
| MFR (g/10 min) | 8.3 | 7.5 | 8.0 | 6.5 | 7.4 |
| Izod impact strength (kg · cm/cm) |  |  |  |  |  |
| +23° C. | 50 | 50 | 39 | 53 | 51 |
| −30° C. | 4.7 | 5.2 | 4.0 | 4.3 | 4.2 |
| Flexural modulus (Kg · f/cm$^2$, ×10$^{-3}$) | 25.2 | 27.3 | 21.0 | 22.1 | 24.7 |
| Heat distortion temp. (°C.) | — | — | — | 78 | — |
| Appearance of molded article | A | A | A | A | A |

TABLE 10

|  | Example 25 | Example 26 | Example 27 | Example 28 | Example 29 |
|---|---|---|---|---|---|
| <Compounding recipe> | | | | | |
| Hydrogenated polymer | | | | | |
| Kind | H-6 | H-7 | H-8 | H-9 | H-1 |
| Amount (part) | 15 | 15 | 15 | 15 | 10 |
| Thermoplastic resin | | | | | |
| Kind | PP-1 | PP-1 | PP-1 | PP-1 | PP-1 |
| Amount (part) | 65 | 65 | 65 | 65 | 65 |
| Talc (part) | 20 | 20 | 20 | 20 | 20 |
| Rubbery polymer | | | | | |
| Kind | — | — | — | — | EP |
| Amount (part) | — | — | — | — | 5 |
| <Physical properties of injection-molded article> | | | | | |
| MFR (g/10 min) | 8.8 | 7.9 | 7.0 | 8.0 | 7.4 |
| Izod impact strength (kg · cm/cm) | | | | | |
| +23° C. | 51 | 38 | 53 | 43 | 38 |
| −30° C. | 4.5 | 4.2 | 4.8 | 3.9 | 3.9 |
| Flexural modulus (Kg · f/cm$^2$, ×10$^{-3}$) | 23.1 | 24.3 | 26.6 | 23.4 | 22.7 |
| Heat distortion temp. (°C.) | — | — | — | — | — |
| Appearance of molded article | A | A | A | A | A |

COMPARATIVE EXAMPLES 19 TO 27

Using the hydrogenated block copolymers K-1 to K-9 shown in Tables 3 and 4, injection molded articles were prepared in the same manner as in Example 20, and various physical properties were evaluated. The results obtained are shown in Tables 11 and 12.

The compositions in which hydrogenated block copolymers which do not satisfy the requirements of this invention are used are inferior in balance of processability, impact resistance, stiffness, heat resistance and appearance of molded article.

TABLE 11

|  | Comparative Example 19 | Comparative Example 20 | Comparative Example 21 | Comparative Example 22 | Comparative Example 23 |
|---|---|---|---|---|---|
| <Compounding recipe> | | | | | |
| Hydrogenated polymer | | | | | |
| Kind | K-1 | K-2 | K-3 | K-4 | K-5 |
| Amount (part) | 15 | 15 | 15 | 15 | 15 |
| Thermoplastic resin | | | | | |
| Kind | PP-1 | PP-1 | PP-1 | PP-1 | PP-1 |
| Amount (part) | 65 | 65 | 65 | 65 | 65 |
| Talc (part) | 20 | 20 | 20 | 20 | 20 |
| <Physical properties of injection-molded article> | | | | | |
| MFR (g/10 min) | 9.1 | 7.3 | 6.5 | 7.2 | 18 |
| Izod impact strength (kg · cm/cm) | | | | | |
| +23° C. | 24 | 18 | 17 | 26 | 10 |
| −30° C. | 2.0 | 1.9 | 1.4 | 2.5 | 1.1 |
| Flexural modulus (Kg · f/cm$^2$, ×10$^{-3}$) | 16.1 | 24.2 | 24.8 | 16.7 | 15.2 |
| Heat distortion temp. (°C.) | — | — | — | — | — |
| Appearance of molded article | A | B | B | A | B |

TABLE 12

|  | Comparative Example 24 | Comparative Example 25 | Comparative Example 26 | Comparative Example 27 |
|---|---|---|---|---|
| <Compounding recipe> | | | | |
| Hydrogenated polymer | | | | |
| Kind | K-6 | K-7 | K-8 | K-9 |
| Amount (part) | 15 | 15 | 15 | 15 |
| Thermoplastic resin | | | | |
| Kind | PP-1 | PP-1 | PP-1 | PP-1 |
| Amount (part) | 65 | 65 | 65 | 65 |
| Talc (part) | 20 | 20 | 20 | 20 |
| <Physical properties of injection-molded article> | | | | |
| MFR (g/10 min) | 1.8 | 17 | 4.4 | 7.5 |
| Izod impact strength (kg · cm/cm) | | | | |
| +23° C. | 28 | 10 | 32 | 15 |
| −30° C. | 3.6 | 1.1 | 2.8 | 1.7 |
| Flexural modulus (Kg · f/cm$^2$, ×10$^{-3}$) | 19.8 | 16.1 | 21.3 | 20.5 |
| Heat distortion temp. (°C.) | — | — | 61 | — |
| Appearance of molded article | C | B | B | C |

COMPARATIVE EXAMPLES 28 TO 30

In the same manner as in Example 20, except that an ethylene-propylene copolymer (EP) (EP02P manufactured by Japan Synthetic Rubber Co., Ltd.), an ethylene-butene-1 copolymer (EBM) (EBM2041P manufactured by Japan Synthetic Rubber Co., Ltd.) or a hydrogenation product of styrene-butadiene-styrene triblock copolymer (SEBS) (Kraton G 1650 manufactured by Shell) was substituted for the hydrogenated block copolymer, an injection molded article was prepared and various physical properties were measured. The results obtained are shown in Table 13.

From these results, it can be seen that as compared with the conventionally used ethylene-propylene copolymer (EP), ethylene-butene-1 copolymer (EBM) and hydrogenation product of styrene-butadiene-styrene triblock copolymer (SEBS), the compositions in which the hydrogenated block copolymer of this invention is used are superior in balance of processability, impact resistance, stiffness, heat resistance and appearance of molded article.

TABLE 13

|  | Comparative Example 28 | Comparative Example 29 | Comparative Example 30 |
|---|---|---|---|
| <Compounding recipe> | | | |
| Hydrogenated polymer | | | |
| Kind | EP | EBM | SEBS |
| Amount (part) | 15 | 15 | 15 |
| Thermoplastic resin | | | |
| Kind | PP-1 | PP-1 | PP-1 |
| Amount (part) | 65 | 65 | 65 |
| Talc (part) | 20 | 20 | 20 |
| <Physical properties of injection-molded article> | | | |
| MFR (g/10 min) | 3.6 | 10.2 | 3.6 |
| Izod impact strength (kg · cm/cm) | | | |
| +23° C. | 25 | 21 | 20 |
| −30° C. | 2.9 | 1.8 | 2.3 |
| Flexural modulus (Kg · f/cm$^2$, ×10$^{-3}$) | 16.5 | 21.8 | 19.5 |
| Heat distortion temp. (°C.) | 58 | 77 | 77 |
| Appearance of molded article | B | B | B |

EXAMPLES 30 TO 34 AND COMPARATIVE EXAMPLES 31 TO 34

Using the compounding recipes shown in Tables 14 and 15, a hydrogenated block copolymer, a thermoplastic resin and a rubbery polymer were placed in a laboplastomill adjusted at a temperature of 190° C. and mixed at 80 rpm for ten minutes. The resulting mixture was discharged and formed into a sheet on a hot roll, and the sheet was press-molded into a square plate of 10 cm ×10 cm in size, after which this plate was cut by means of a dumbbell cutter to form a test piece for measurement.

Incidentally, when the composition obtained was to be cross-linked, a cross-linking agent was added after the hydrogenated block copolymer, the thermoplastic resin and the rubbery polymer had been completely melted. In this case, after the addition of the cross-linking agent, mixing was continued at 80 rpm and the output torque was observed by means of a torque meter attached to the laboplastomill and the mixing was continued for three minutes from the time when the maximum torque value was shown, after which the mixture was discharged.

Examples 30 to 34 are examples in which the hydrogenated block copolymer of this invention is used, and the composition of each of these Examples is found to be a composition reflecting the excellent properties of the hydrogenated block copolymer. On the other hand, Comparative Examples 31 to 33 are examples in which the hydrogenated block copolymer of this invention is not used, and the elongation at break is low, the hardness is high and the permanent elongation is inferior. Comparative Example 34 is an example in which a hydrogenated block copolymer outside the scope of this invention is used, and the hardness is high and the permanent elongation is inferior.

TABLE 14

|  | Example 30 | Example 31 | Example 32 | Example 33 | Example 34 |
|---|---|---|---|---|---|
| <Compounding recipe> | | | | | |
| Hydrogenated polymer | | | | | |
| Kind | H-1 | H-1 | H-1 | H-2 | H-2 |
| Amount (part by wt.) | 60 | 60 | 40 | 70 | 40 |
| Thermoplastic resin | | | | | |
| Kind | PE*1 | PP-2*2 | PP-2 | PP-2 | PP-2 |
| Amount (part) | 40 | 40 | 30 | 30 | 30 |
| Rubber polymer | | | | | |
| Kind | — | — | EBM | — | EP |
| Amount (part) | — | — | 30 | — | 30 |
| Cross-linking agent (part) | | | | | |
| Di-t-butyl peroxide | — | — | — | 1.0 | 1.0 |
| Triallyl cyanurate | — | — | — | 1.2 | 1.2 |
| <Physical properties> | | | | | |
| Tensile strength (kg/cm$^2$) | 130 | 160 | 120 | 220 | 200 |
| Elongation at break (%) | 830 | 940 | 800 | 730 | 790 |
| Permanent elongation at 100% elongation (%) | 24 | 27 | 29 | 10 | 12 |
| Hardness (JIS A) | 74 | 76 | 70 | 70 | 63 |

Note:
*1: Polyethylene ZF-51 manufactured by Mitsubishi Petrochemical Co., Ltd.
*2: Polypropylene MA-7 manufactured by Mitsubishi Petrochemical Co., Ltd.

TABLE 15

|  | Comparative Example 31 | Comparative Example 32 | Comparative Example 33 | Comparative Example 34 |
|---|---|---|---|---|
| <Compounding recipe> | | | | |
| Hydrogenated polymer | | | | |
| Kind | — | — | SEBS | K-8 |

TABLE 15-continued

|  | Comparative Example 31 | Comparative Example 32 | Comparative Example 33 | Comparative Example 34 |
|---|---|---|---|---|
| Amount (part) | — | — | 60 | 60 |
| Thermoplastic resin | | | | |
| Kind | PE | PP-2 | PP-2 | PP-2 |
| Amount (part) | 40 | 40 | 40 | 40 |
| Rubber polymer | | | | |
| Kind | EBM | EP | — | — |
| Amount (part) | 60 | 60 | — | — |
| Cross-linking agent (part) | | | | |
| Di-t-butyl peroxide | — | — | — | — |
| Triallyl cyanurate | — | — | — | — |
| <Physical properties> | | | | |
| Tensile strength (kg/cm$^2$) | 100 | 110 | 232 | 110 |
| Elongation at break (%) | 340 | 140 | 210 | 780 |
| Permanent elongation at 100% elongation (%) | 45 | 56 | 45 | 38 |
| Hardness (JIS A) | 95 | 96 | 98 | 88 |

EXAMPLES 35 TO 44

The hydrogenated block copolymers H-10 to H-18 obtained in Examples 10 to 18 were mixed with a polypropylene resin (PP-1), talc, an ethylene-propylene copolymer and EP (EP02P manufactured by Japan Synthetic Rubber Co., Ltd.) in the weight proportions shown in Tables 16 and 17 by means of a 4-liter Banbury type kneader. The kneaded composition was formed into a sheet, and this sheet was cut to square pellets, after which the square pellets were injection-molded into test pieces for evaluating physical properties. The results of the evaluation of physical properties are shown in Tables 16 and 17. These Examples are all concerned with compositions in which the hydrogenated block copolymer of this invention are used and the compositions are excellent in balance of processability, impact resistance, stiffness, heat resistance and appearance of molded article.

TABLE 16

|  | Example 35 | Example 36 | Example 37 | Example 38 | Example 39 |
|---|---|---|---|---|---|
| <Compounding recipe> | | | | | |
| Hydrogenated polymer | | | | | |
| Kind | H-10 | H-11 | H-12 | H-13 | H-14 |
| Amount (part) | 15 | 15 | 15 | 15 | 15 |
| Thermoplastic resin | | | | | |
| Kind | PP-1 | PP-1 | PP-1 | PP-1 | PP-1 |
| Amount (part) | 65 | 65 | 65 | 65 | 65 |
| Talc (part) | 20 | 20 | 20 | 20 | 20 |
| <Physical properties of injection-molded article> | | | | | |
| MFR (g/10 min) | 8.1 | 7.5 | 9.5 | 6.3 | 8.1 |
| Izod impact strength (kg · cm/cm) | | | | | |
| +23° C. | 56 | 53 | 39 | 59 | 54 |
| −30° C. | 5.6 | 5.3 | 4.3 | 5.6 | 5.3 |
| Flexural modulus (Kg · f/cm$^2$, ×10$^{-3}$) | 26.2 | 27.6 | 23.6 | 25.6 | 25.3 |
| Heat distortion temp. (°C.) | — | — | — | 79 | — |
| Appearance of molded article | A | A | A | A | A |

TABLE 17

|  | Example 40 | Example 41 | Example 42 | Example 43 | Example 44 |
|---|---|---|---|---|---|
| <Compounding recipe> | | | | | |
| Hydrogenated polymer | | | | | |
| Kind | H-15 | H-16 | H-17 | H-18 | H-10 |
| Amount (part) | 15 | 15 | 15 | 15 | 10 |
| Thermoplastic resin | | | | | |
| Kind | PP-1 | PP-1 | PP-1 | PP-1 | PP-1 |
| Amount (part) | 65 | 65 | 65 | 65 | 65 |
| Talc (part) | 20 | 20 | 20 | 20 | 20 |
| Rubbery polymer | | | | | |
| Kind | — | — | — | — | EP |
| Amount (part) | — | — | — | — | 5 |
| <Physical properties of injection-molded article> | | | | | |
| MFR (g/10 min) | 7.9 | 7.4 | 8.0 | 8.3 | 7.4 |
| Izod impact strength (kg · cm/cm) | | | | | |
| +23° C. | 56 | 47 | 51 | 54 | 44 |
| −30° C. | 5.3 | 4.8 | 4.4 | 5.0 | 4.7 |
| Flexural modulus (Kg · f/cm$^2$, ×10$^{-3}$) | 23.7 | 24.9 | 26.5 | 25.1 | 23.8 |
| Heat distortion temp. (°C.) | — | — | — | — | — |
| Appearance of molded article | A | A | A | A | A |

COMPARATIVE EXAMPLES 35 TO 43

In the same manner as in Example 35, injection molded articles were prepared from the hydrogenated block copolymers K-10 to K-18 shown in Tables 7 and 8 and subjected to evaluation of physical properties. The results obtained are shown in Tables 18 and 19. In the case of a composition in which the hydrogenated block copolymer used does not satisfy the requirements of this invention, the balance of processibility, impact resistance, stiffness, heat resistance and appearance of molded article is not satisfactory.

TABLE 18

|  | Comparative Example 35 | Comparative Example 36 | Comparative Example 37 | Comparative Example 38 | Comparative Example 39 |
|---|---|---|---|---|---|
| <Compounding recipe> | | | | | |
| Hydrogenated polymer | | | | | |
| Kind | K-10 | K-11 | K-12 | K-13 | K-14 |
| Amount (part) | 15 | 15 | 15 | 15 | 15 |
| Thermoplastic resin | | | | | |
| Kind | PP-1 | PP-1 | PP-1 | PP-1 | PP-1 |
| Amount (part) | 65 | 65 | 65 | 65 | 65 |
| Talc (part) | 20 | 20 | 20 | 20 | 20 |
| <Physical properties of injection-molded article> | | | | | |
| MFR (g/10 min) | 8.6 | 7.1 | 6.6 | 7.3 | 18 |
| Izod impact strength (kg · cm/cm) | | | | | |
| +23° C. | 24 | 17 | 15 | 26 | 10 |
| −30° C. | 2.0 | 1.7 | 1.3 | 1.5 | 1.0 |
| Flexural modulus (Kg · f/cm$^2$, ×10$^{-3}$) | 16.2 | 24.3 | 24.8 | 16.5 | 15.1 |
| Heat distortion temp. (°C.) | — | — | — | — | — |
| Appearance of molded article | A | B | B | A | B |

TABLE 19

|  | Comparative Example 40 | Comparative Example 41 | Example 45 | Comparative Example 42 | Comparative Example 43 |
|---|---|---|---|---|---|
| <Compounding recipe> | | | | | |
| Hydrogenated polymer | | | | | |
| Kind | K-15 | K-16 | K-19 | K-17 | K-18 |
| Amount (part) | 15 | 15 | 15 | 15 | 15 |
| Thermoplastic resin | | | | | |
| Kind | PP-1 | PP-1 | PP-1 | PP-1 | PP-1 |
| Amount (part) | 65 | 65 | 65 | 65 | 65 |
| Talc (part) | 20 | 20 | 20 | 20 | 20 |
| <Physical properties of injection-molded article> | | | | | |
| MFR (g/10 min) | 1.5 | 16 | 3.2 | 3.7 | 7.8 |
| Izod impact strength (kg · cm/cm) | | | | | |
| +23° C. | 27 | 12 | 34 | 31 | 17 |
| −30° C. | 3.5 | 1.1 | 2.9 | 2.7 | 1.6 |
| Flexural modulus (Kg · f/cm$^2$, ×10$^{-3}$) | 19.8 | 16.1 | 22.4 | 21.0 | 20.4 |
| Heat distortion temp. (°C.) | — | — | — | 61 | — |
| Appearance of molded article | C | B | B | B | C |

COMPARATIVE EXAMPLES 44 TO 46

In the same manner as in Example 35, except that the hydrogenated block copolymer was replaced with an ethylene-propylene copolymer (EP) (EP02P manufactured by Japan Synthetic Rubber Co., Ltd.), an ethylene-butene-1 copolymer (EBM) (EBM2041P manufactured by Japan Synthetic Rubber Co., Ltd.) or a hydrogenated styrene-butadiene-styrene triblock copolymer (SEBS) (Craton G1650 manufactured by Shell), an injection molded article was prepared, and various physical properties thereof were measured. The results obtained are shown in Table 20.

From comparison of the results, it can be seen that the compositions in which the hydrogenated block copolymers of this invention are used are superior in balance of processibility, impact resistance, stiffness, heat resistance and appearance of molded article to the conventional ethylene-propylene copolymer (EP), ethylene-butene-1 copolymer (EBM) and hydrogenated styrene-butadiene-styrene triblock copolymer (SEBS).

TABLE 20

|  | Comparative Example 44 | Comparative Example 45 | Comparative Example 46 |
|---|---|---|---|
| <Compounding recipe> | | | |
| Hydrogenated polymer | | | |
| Kind | EP | EBM | SEBS |
| Amount (part) | 15 | 15 | 15 |
| Thermoplastic resin | | | |
| Kind | PP-1 | PP-1 | PP-1 |
| Amount (part) | 65 | 65 | 65 |
| Talc (part) | 20 | 20 | 20 |
| <Physical properties of injection-molded article> | | | |
| MFR (g/10 min) | 3.6 | 10.2 | 3.6 |
| Izod impact strength (kg · cm/cm) | | | |
| +23° C. | 25 | 21 | 20 |
| −30° C. | 2.9 | 1.8 | 2.3 |
| Flexural modulus (Kg · f/cm$^2$, ×10$^{-3}$) | 16.5 | 21.8 | 19.5 |
| Heat distortion temp. (°C.) | 58 | 77 | 77 |
| Appearance of molded article | B | B | B |

EXAMPLES 46 TO 50 AND COMPARATIVE EXAMPLE 47

Using the compounding recipes shown in Table 21, a hydrogenated block copolymer, a thermoplastic resin and a rubbery polymer were charged into a laboplastomill adjusted at a temperature of 190° C. and mixed at 80 rpm for ten minutes. The mixture was discharged from the mill and formed into a sheet on a hot roll, after which the resulting sheet was press-molded to form a square plate of 10 cm×10 cm in size, after which the square plate was cut into a test pieces for measurement by means of a dumbbell cutter.

Incidentally, when a cross-linking agent was to be added, this was added after the hydrogenated block copolymer, the thermoplastic resin and the rubbery polymer were completed melted. In this case, after the addition of the cross-linking agent, mixing at 80 rpm was continued and output torque was observed through a torque meter attached to the laboplastomill, and the mixing was continued for three minutes from the point at which the maximum torque value was shown, after which the mixture was discharged.

Examples 46 to 50 are examples in which the hydrogenated block copolymer of this invention is used and it can be seen that all of them are compositions reflecting the excellent properties of the hydrogenated block copolymer. Comparative Example 47 is an example in which a hydrogenated block copolymer outside the scope of this invention is used and the example is high in hardness and inferior in permanent elongation.

TABLE 21

|  | Example 46 | Example 47 | Example 48 | Example 49 | Example 50 | Comparative Example 47 |
|---|---|---|---|---|---|---|
| <Compounding recipe> | | | | | | |
| Hydrogenated polymer | | | | | | |
| Kind | H-10 | H-10 | H-10 | H-11 | H-11 | K-17 |
| Amount (part) | 60 | 60 | 40 | 70 | 40 | 60 |
| Thermoplastic resin | | | | | | |
| Kind | PE*[1] | PP-2*[2] | PP-2 | PP-2 | PP-2 | PP-2 |
| Amount (part) | 40 | 40 | 30 | 30 | 30 | 40 |
| Rubbery polymer | | | | | | |
| Kind | — | — | EBM | — | EP | — |
| Amount (part) | — | — | 30 | — | 30 | — |
| Cross-linking agent (part) | | | | | | |
| Di-t-butyl peroxide | — | — | — | 1.0 | 1.0 | — |
| Triallyl cyanurate | — | — | — | 1.2 | 1.2 | — |
| <Physical properties> | | | | | | |
| Tensile strength (kg/cm$^2$) | 150 | 180 | 140 | 250 | 230 | 100 |
| Elongation at break (%) | 850 | 950 | 850 | 760 | 830 | 800 |
| Permanent elongation at 100% elongation (%) | 23 | 26 | 27 | 11 | 11 | 39 |
| Hardness (JIS A) | 73 | 75 | 69 | 69 | 62 | 87 |

Note:
*[1]: Polyethylene ZF-51 manufactured by Mitsubishi Petrochemical Co., Ltd.
*[2]: Polypropylene MA-7 manufactured by Mitsubishi Petrochemical Co., Ltd.

What is claimed is:

1. A hydrogenated block copolymer composition comprising as main components,
   (I) 1 to 99 parts by weight of a hydrogenated block copolymer or hydrogenated block copolymer mixture which consists essentially of:
      (a) a hydrogenation product of a star-branched block copolymer represented by the structural formula $(A-B)_nX$ wherein A is a polybutadiene block having a 1,2-vinyl content of less than 25% by weight; B is a conjugated diene polymer block comprising at least 50% by weight of a conjugated diene compound whose vinyl content is at least 25% by weight; X is a polyfunctional coupling agent residue and n is an integer of 3 or more, the content of the block A being 5 to 60% by weight and the content of the block B being 95 to 40% by weight, provided that A+B= 100% by weight, at least 80% or more of the double bonds of the conjugated diene portion of the starbranched block copolymer having been hydrogenated, and
      (b) a hydrogenation product of a straight chain block copolymer represented by the structural formula A–B wherein A and B are as defined above, the content of the block A being 5 to 60% by weight and the content of the block B being 95 to 40% by weight, provided that A+B=100% by weight, at least 80% or more of the double bonds of the conjugated diene portion of the straight chain block copolymer having been hydrogenated, the weight ratio of the hydrogenated block copolymer (a) to the hydrogenated block copolymer (b) being 100/0 to 5/95, and the weight average molecular weight of the total of the hydrogenated block copolymer (a) and the hydrogenated block copolymer (b) being 50,000 to 700,000, and
   (II) 99 to 1 part by weight of a thermoplastic resin and/or a rubbery polymer, provided that (I)+(II)=100 parts by weight.

2. The hydrogenated block copolymer composition according to claim 1, wherein the thermoplastic resin is at least one member selected from the group consisting of polyolefins, polystyrenes, polyamides, polyacetals, polyesters, polyphenylene ethers, polyphenylene sulfides, polysulfones and polycarbonates.

3. The hydrogenated block copolymer composition according to claim 1, wherein the thermoplastic resin is at least one member selected from the group consisting of polypropylene and polyethylene.

4. The hydrogenated block copolymer composition according to claim 1, wherein the weight ratio of the hydrogenated block copolymer (a) to the hydrogenated block copolymer (b) in the component (I) is 95/5 to 80/20.

5. The hydrogenated block copolymer composition according to claim 1, wherein a filler is contained in an amount of 1 to 150 parts by weight per 100 parts by weight of a total of the components (I) and (II).

6. The hydrogenated block copolymer composition according to claim 1, wherein a softening agent is contained in an amount of 1 to 400 parts by weight per 100 parts by weight of a total of the components (I) and (II).

7. The hydrogenated block copolymer composition according to claim 1, wherein the 1,2-vinyl content of the component (I) is 20% by weight or less.

8. The hydrogenated block copolymer composition according to claim 1, wherein the conjugated diene compound of the component (I) is at least one compound selected from the group consisting of 1,3-butadiene, isoprene and 1,3-pentadiene.

9. The hydrogenated block copolymer composition according to claim 1, wherein the content of the conjugated diene compound in the block B of the component (I) is 60% by weight or more.

10. The hydrogenated block copolymer composition according to claim 1, wherein the content of the block A in the star-branched block copolymer or the straight chain block copolymer is 5 to 55% by weight.

11. The hydrogenated block copolymer composition according to claim 1, wherein the weight ratio of the hydrogenated block copolymer (a) to the hydrogenated block copolymer (b) in the component (I) is 95/5 to 40/60.

12. The hydrogenated block copolymer composition according to claim 1, wherein the weight average molecular weight of the total of the hydrogenated block copolymer (a) and the hydrogenated block copolymer (b) is 70,000 to 650,000.

13. The hydrogenated block copolymer composition according to claim 1, wherein the hydrogenated block copolymer or hydrogenated block copolymer mixture which is the component (I) is obtained by hydrogenating a block copolymer or block copolymer mixture comprising a star-branched block copolymer represented by the structural formula $(A-B)_n X$ wherein A, B, X and n are as defined in claim 1 obtained by subjecting a conjugated diene compound and if necessary other vinyl monomers to living anionic polymerization in an organic solvent using an organic alkali metal compound as an initiator to obtain a straight chain block copolymer represented by the structural formula A–B in which A and B are as defined in claim 1 and then subjecting the said straight chain block copolymer to coupling reaction in the presence of a polyfunctional coupling agent in an amount of not more than equivalent thereto.

14. The hydrogenated block copolymer composition according to claim 13, wherein the straight chain block copolymer is prepared by first forming the block A and then forming the block B.

15. The hydrogenated block copolymer composition according to claim 1, wherein the polyfunctional coupling agent residue is the residue of at least one compound having three or more functional groups selected from the group consisting of polyvinyl aromatic compounds, polyepoxy compounds, polyisocyanate compounds, polycarboxylic acid ester compounds, polycarboxylic dianhydride compounds, carbonic acid ester compounds, polyketone compounds, polyaldehyde compounds, polyhalogenated hydrocarbon compounds, silicon compounds, tin compounds, germanium compounds and polyaziridinyl compounds.

16. The hydrogenated block copolymer composition according to claim 13, wherein the polyfunctional coupling agent is at least one compound having three or more functional groups selected from the group consisting of polyvinyl aromatic compounds, polyepoxy compounds, polyisocyanate compounds, polycarboxylic acid ester compounds, polycarboxylic dianhydride compounds, carbonic acid ester compounds, polyketone compounds, polyaldehyde compounds, polyhalogenated hydrocarbon compounds, silicon compounds, tin compounds, germanium compounds and polyaziridinyl compounds.

* * * * *